United States Patent [19]

Lidke et al.

[11] Patent Number: 5,805,183
[45] Date of Patent: Sep. 8, 1998

[54] INK JET PRINTER WITH VARIABLE ADVANCE INTERLACING

[75] Inventors: Steven L. Lidke, Chaska; Jeff D. Pagel, Inver Grove Heights; Paul R. Erickson, Prior Lake, all of Minn.

[73] Assignee: LaserMaster Corporation, Eden Prairie, Minn.

[21] Appl. No.: 337,074

[22] Filed: Nov. 10, 1994

[51] Int. Cl.$^6$ .............................. B41J 2/145; B41J 29/38
[52] U.S. Cl. .................................................. 347/41; 347/16
[58] Field of Search .................... 347/41, 43, 37, 347/16

[56] References Cited

U.S. PATENT DOCUMENTS

| | | |
|---|---|---|
| 4,755,836 | 7/1988 | Ta et al. . |
| 4,761,154 | 8/1988 | Beauchamp et al. . |
| 4,835,554 | 5/1989 | Hoisington et al. . |
| 4,891,654 | 1/1990 | Hoisington et al. . |
| 4,907,018 | 3/1990 | Pinkerpell et al. . |
| 4,965,593 | 10/1990 | Hickman ............................ 347/41 X |
| 4,992,806 | 2/1991 | Peer . |
| 5,036,340 | 7/1991 | Osborne . |
| 5,049,898 | 9/1991 | Arthur et al. . |
| 5,059,984 | 10/1991 | Moore et al. . |
| 5,070,345 | 12/1991 | Lahut et al. . |
| 5,075,689 | 12/1991 | Hoisington et al. . |
| 5,079,571 | 1/1992 | Eriksen . |
| 5,109,239 | 4/1992 | Cobbs et al. . |
| 5,177,504 | 1/1993 | Ishii et al. . |
| 5,239,312 | 8/1993 | Merna et al. . |
| 5,250,956 | 10/1993 | Haselby et al. . |
| 5,265,315 | 11/1993 | Hoisington et al. . |
| 5,276,970 | 1/1994 | Wilcox et al. . |
| 5,485,183 | 1/1996 | Zandain et al. ............................ 347/41 |

FOREIGN PATENT DOCUMENTS

| | | |
|---|---|---|
| A 0 408071 | 1/1991 | European Pat. Off. . |
| A 0 517543 | 12/1992 | European Pat. Off. . |
| A 0 539157 | 4/1993 | European Pat. Off. . |
| 54-158232 | 12/1979 | Japan ....................................... 347/37 |

*Primary Examiner*—David F. Yockey
*Attorney, Agent, or Firm*—Kinney & Lange, P.A.; Paul H. McDowall

[57] ABSTRACT

A scanning head ink jet printer utilizes variable paper advance interlacing. The printer includes a plurality of heads each having a plurality of rows of uniformly spaced ink jets which print different colors. A printing medium is advanced in a series of non-uniform distances ($d_1$, $d_2$, $d_3$, $d_4$) the sum of which is equal to the total number of uniformly-spaced ink jets (n) of one of the colors times the uniform spacing (s) of one pixel row from an adjacent pixel row. In a specific embodiment, a total advance of the printing medium is equal to the total number of uniformly-serial spaced ink jets of one color is 48, the spacing is four pixels, and the non-uniform distances include 49, 49, 45 and 49 pixels.

3 Claims, 20 Drawing Sheets

| PIXEL ROW 150 | PASS # 152 | JET # 154 | |
|---|---|---|---|
| 1 | 5 | 1 | |
| 2 | 8 | 37 | |
| 3 | 7 | 26 | |
| 4 | 6 | 14 | |
| 5 | 5 | 2 | |
| 6 | 8 | 38 | |
| 7 | 7 | 27 | |
| 8 | 6 | 15 | |
| 9 | 5 | 3 | |
| ⋮ | | | $d_4$=49 |
| 45 | 5 | 12 | |
| 46 | 8 | 48 | |
| 47 | 7 | 37 | |
| 48 | 6 | 25 | |
| 49 | 5 | 13 | |
| 50 | 4 | 1 | |
| 51 | 7 | 38 | |
| 52 | 6 | 26 | |
| 53 | 5 | 14 | |
| 54 | 4 | 2 | |
| ⋮ | | | $d_3$=45 |
| 92 | 6 | 36 | |
| 93 | 5 | 24 | |
| 94 | 4 | 12 | |
| 95 | 3 | 1 | |
| 96 | 6 | 37 | |
| 97 | 5 | 25 | |
| 98 | 4 | 13 | $d_2$=49 |
| 99 | 3 | 2 | |
| 100 | 6 | 38 | |

| PIXEL ROW 150 | PASS # 152 | JET # 154 | |
|---|---|---|---|
| 101 | 5 | 26 | |
| 102 | 4 | 14 | |
| ⋮ | | | $d_2$=49 |
| 140 | 6 | 48 | |
| 141 | 5 | 36 | |
| 142 | 4 | 24 | |
| 143 | 3 | 13 | |
| 144 | 2 | 1 | |
| 145 | 5 | 37 | |
| 146 | 4 | 25 | |
| 147 | 3 | 14 | |
| 149 | 2 | 2 | |
| ⋮ | | | $d_1$=49 |
| 188 | 2 | 12 | |
| 189 | 5 | 48 | |
| 190 | 4 | 36 | |
| 191 | 3 | 25 | |
| 192 | 2 | 13 | |
| 193 | 1 | 1 | |
| 194 | 4 | 37 | |
| 195 | 3 | 26 | |
| 196 | 2 | 14 | |
| 197 | 1 | 2 | |
| ⋮ | | | s=4 |
| 235 | 3 | 36 | |
| 236 | 2 | 24 | |
| 237 | 1 | 12 | n=8 |
| 238 | 4 | 48 | |
| 239 | 3 | 37 | |
| 240 | 2 | 25 | |

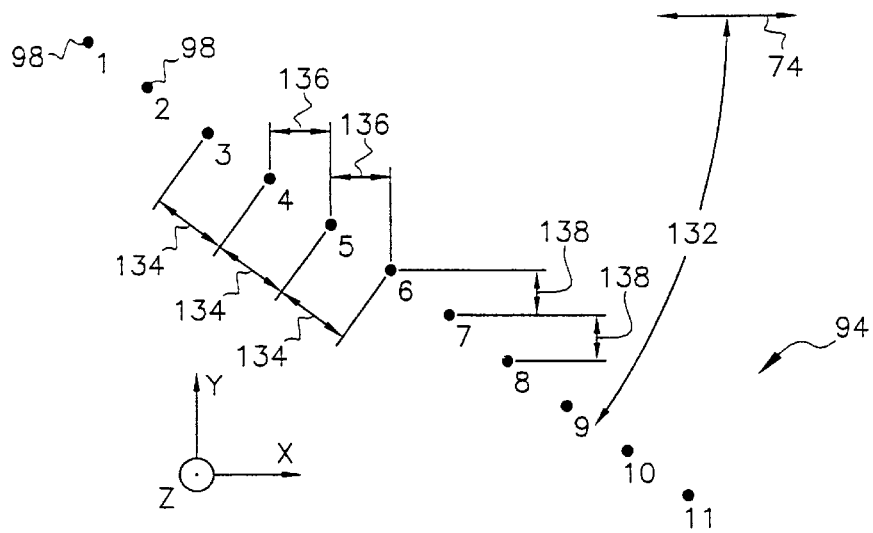
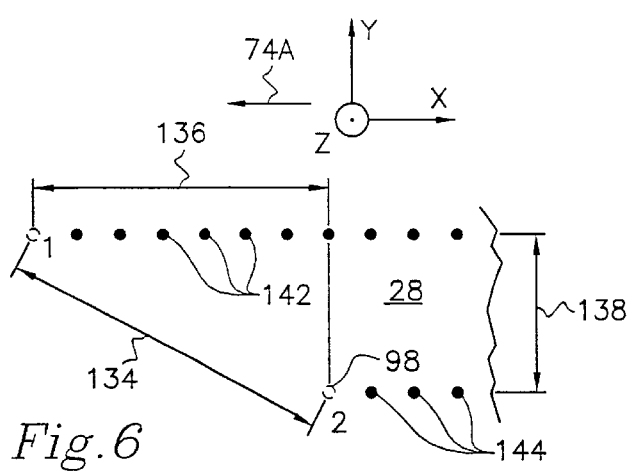
Fig.6
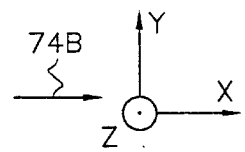
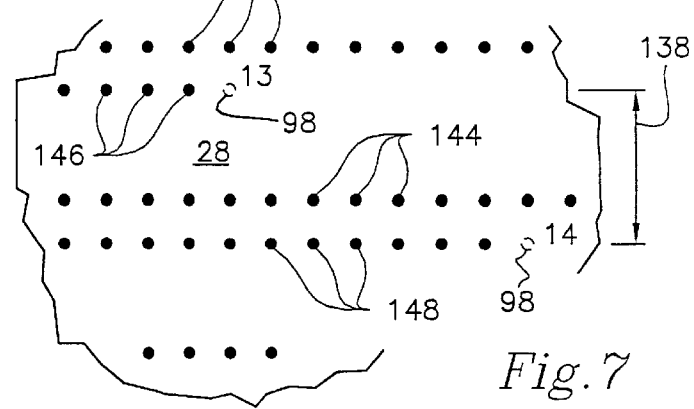
Fig.7

| PIXEL ROW 150 | PASS # 152 | JET # 154 |
|---|---|---|
| 1 | . | . |
| 2 | . | . |
| 3 | . | . |
| 4 | . | . |
| 5 | . | . |
| 6 | . | . |
| 7 | . | . |
| 8 | . | . |
| 9 | . | . |
| 10 | . | . |
| 11 | . | . |
| 12 | . | . |
| 13 | . | . |
| 14 | . | . |
| 15 | . | . |
| 16 | . | . |
| 17 | . | . |
| 18 | . | . |
| 19 | . | . |
| 20 | . | . |
| 21 | . | . |
| 22 | . | . |
| 23 | . | . |
| 24 | . | . |
| 25 | . | . |
| 26 | . | . |
| 27 | . | . |
| 28 | . | . |
| 29 | . | . |
| 30 | . | . |
| 31 | . | . |
| 32 | 1 | 1 |
| 33 | . | . |
| 34 | . | . |
| 35 | . | . |
| 36 | 1 | 2 |

Fig.8A

| PIXEL ROW 150 | PASS # 152 | JET # 154 |
|---|---|---|
| 1 | . | . |
| 2 | . | . |
| 3 | . | . |
| 4 | . | . |
| 5 | . | . |
| 6 | . | . |
| 7 | . | . |
| 8 | . | . |
| 9 | . | . |
| 10 | . | . |
| 11 | . | . |
| 12 | . | . |
| 13 | . | . |
| 14 | . | . |
| 15 | . | . |
| 16 | . | . |
| 17 | . | . |
| 18 | . | . |
| 19 | . | . |
| 20 | . | . |
| 21 | . | . |
| 22 | . | . |
| 23 | . | . |
| 24 | . | . |
| 25 | . | . |
| 26 | . | . |
| 27 | 2 | 1 |
| 28 | . | . |
| 29 | . | . |
| 30 | . | . |
| 31 | 2 | 2 |
| 32 | 1 | 1 |
| 33 | . | . |
| 34 | . | . |
| 35 | 2 | 3 |
| 36 | 1 | 2 |

Fig.8B

| PIXEL ROW 150 | PASS # 152 | JET # 154 |
|---|---|---|
| 1 | . | . |
| 2 | . | . |
| 3 | . | . |
| 4 | . | . |
| 5 | . | . |
| 6 | . | . |
| 7 | . | . |
| 8 | . | . |
| 9 | . | . |
| 10 | . | . |
| 11 | . | . |
| 12 | . | . |
| 13 | . | . |
| 14 | . | . |
| 15 | . | . |
| 16 | . | . |
| 17 | . | . |
| 18 | . | . |
| 19 | . | . |
| 20 | . | . |
| 21 | . | . |
| 22 | . | . |
| 23 | . | . |
| 24 | . | . |
| 25 | 3 | 1 |
| 26 | . | . |
| 27 | 2 | 1 |
| 28 | . | . |
| 29 | 3 | 2 |
| 30 | . | . |
| 31 | 2 | 2 |
| 32 | 1 | 1 |
| 33 | 3 | 3 |
| 34 | . | . |
| 35 | 2 | 3 |
| 36 | 1 | 2 |

Fig.8C

| PIXEL ROW 150 | PASS # 152 | JET # 154 | PIXEL ROW 150 | PASS # 152 | JET # 154 | PIXEL ROW 150 | PASS # 152 | JET # 154 |
|---|---|---|---|---|---|---|---|---|
| 1 | . | . | 1 | . | . | 1 | 11 | 3 |
| 2 | . | . | 2 | . | . | 2 | 12 | 4 |
| 3 | . | . | 3 | . | . | 3 | 10 | 3 |
| 4 | . | . | 4 | . | . | 4 | 9 | 2 |
| 5 | . | . | 5 | . | . | 5 | 11 | 4 |
| 6 | . | . | 6 | . | . | 6 | 8 | 1 |
| 7 | . | . | 7 | . | . | 7 | 10 | 4 |
| 8 | . | . | 8 | . | . | 8 | 9 | 3 |
| 9 | . | . | 9 | . | . | 9 | 7 | 1 |
| 10 | . | . | 10 | . | . | 10 | 8 | 2 |
| 11 | . | . | 11 | . | . | 11 | 6 | 1 |
| 12 | . | . | 12 | . | . | 12 | 9 | 4 |
| 13 | . | . | 13 | . | . | 13 | 7 | 2 |
| 14 | . | . | 14 | . | . | 14 | 8 | 3 |
| 15 | . | . | 15 | . | . | 15 | 6 | 2 |
| 16 | . | . | 16 | 5 | 1 | 16 | 5 | 1 |
| 17 | . | . | 17 | . | . | 17 | 7 | 3 |
| 18 | . | . | 18 | . | . | 18 | 8 | 4 |
| 19 | . | . | 19 | . | . | 19 | 6 | 3 |
| 20 | . | . | 20 | 5 | 2 | 20 | 5 | 2 |
| 21 | . | . | 21 | . | . | 21 | 7 | 4 |
| 22 | 4 | 1 | 22 | 4 | 1 | 22 | 4 | 1 |
| 23 | . | . | 23 | . | . | 23 | 6 | 4 |
| 24 | . | . | 24 | 5 | 3 | 24 | 5 | 3 |
| 25 | 3 | 1 | 25 | 3 | 1 | 25 | 3 | 1 |
| 26 | 4 | 2 | 26 | 4 | 2 | 26 | 4 | 2 |
| 27 | 2 | 1 | 27 | 2 | 1 | 27 | 2 | 1 |
| 28 | . | . | 28 | 5 | 4 | 28 | 5 | 4 |
| 29 | 3 | 2 | 29 | 3 | 2 | 29 | 3 | 2 |
| 30 | 4 | 3 | 30 | 4 | 3 | 30 | 4 | 3 |
| 31 | 2 | 2 | 31 | 2 | 2 | 31 | 2 | 2 |
| 32 | 1 | 1 | 32 | 1 | 1 | 32 | 1 | 1 |
| 33 | 3 | 3 | 33 | 3 | 3 | 33 | 3 | 3 |
| 34 | 4 | 4 | 34 | 4 | 4 | 34 | 4 | 4 |
| 35 | 2 | 3 | 35 | 2 | 3 | 35 | 2 | 3 |
| 36 | 1 | 2 | 36 | 1 | 2 | 36 | 1 | 2 |

| PIXEL ROW (150) | PASS # (152) | JET # (154) |
|---|---|---|
| 1 | 12 | 4 |
| 2 | 11 | 3 |
| 3 | 10 | 2 |
| 4 | 9 | 1 |
| 5 | 8 | 1 |
| 6 | 11 | 4 |
| 7 | 10 | 3 |
| 8 | 9 | 2 |
| 9 | 8 | 2 |
| 10 | 7 | 1 |
| 11 | 10 | 4 |
| 12 | 9 | 3 |
| 13 | 8 | 3 |
| 14 | 7 | 2 |
| 15 | 6 | 1 |
| 16 | 9 | 4 |
| 17 | 8 | 4 |
| 18 | 7 | 3 |
| 19 | 6 | 2 |
| 20 | 5 | 1 |
| 21 | 4 | 1 |
| 22 | 7 | 4 |
| 23 | 6 | 3 |
| 24 | 5 | 2 |
| 25 | 4 | 2 |
| 26 | 3 | 1 |
| 27 | 6 | 4 |
| 28 | 5 | 3 |
| 29 | 4 | 3 |
| 30 | 3 | 2 |
| 31 | 2 | 1 |
| 32 | 5 | 4 |
| 33 | 4 | 4 |
| 34 | 3 | 3 |
| 35 | 2 | 2 |
| 36 | 1 | 1 |

$s=4$, $n=4$ (rows 5–17)
$d_4=1$, $d_3=5$, $d_2=5$, $d_1=5$

*Fig. 8G*

| PIXEL ROW (150) | PASS # (152) | JET # (154) |
|---|---|---|
| 1 | 10 | 2 |
| 2 | 11 | 3 |
| 3 | 12 | 4 |
| 4 | 9 | 2 |
| 5 | 10 | 3 |
| 6 | 11 | 4 |
| 7 | 8 | 1 |
| 8 | 9 | 3 |
| 9 | 10 | 4 |
| 10 | 7 | 1 |
| 11 | 8 | 2 |
| 12 | 9 | 4 |
| 13 | 6 | 1 |
| 14 | 7 | 2 |
| 15 | 8 | 3 |
| 16 | 5 | 1 |
| 17 | 6 | 2 |
| 18 | 7 | 3 |
| 19 | 8 | 4 |
| 20 | 5 | 2 |
| 21 | 6 | 3 |
| 22 | 7 | 4 |
| 23 | 4 | 1 |
| 24 | 5 | 3 |
| 25 | 6 | 4 |
| 26 | 3 | 1 |
| 27 | 4 | 2 |
| 28 | 5 | 4 |
| 29 | 2 | 1 |
| 30 | 3 | 2 |
| 31 | 4 | 3 |
| 32 | 1 | 1 |
| 33 | 2 | 2 |
| 34 | 3 | 3 |
| 35 | 4 | 4 |
| 36 | 1 | 2 |

$s=4$, $n=4$ (rows 7–19)
$d_4=7$, $d_3=3$, $d_2=3$, $d_1=3$

*Fig. 8H*

| PIXEL ROW 150 | PASS # 152 | JET # 154 |
|---|---|---|
| 1 | 5 | 1 |
| 2 | 8 | 37 |
| 3 | 7 | 26 |
| 4 | 6 | 14 |
| 5 | 5 | 2 |
| 6 | 8 | 38 |
| 7 | 7 | 27 |
| 8 | 6 | 15 |
| 9 | 5 | 3 |
| ⋮ ($d_4=49$) | | |
| 45 | 5 | 12 |
| 46 | 8 | 48 |
| 47 | 7 | 37 |
| 48 | 6 | 25 |
| 49 | 5 | 13 |
| 50 | 4 | 1 |
| 51 | 7 | 38 |
| 52 | 6 | 26 |
| 53 | 5 | 14 |
| 54 | 4 | 2 |
| ⋮ ($d_3=45$) | | |
| 92 | 6 | 36 |
| 93 | 5 | 24 |
| 94 | 4 | 12 |
| 95 | 3 | 1 |
| 96 | 6 | 37 |
| 97 | 5 | 25 |
| 98 | 4 | 13 |
| 99 | 3 | 2 |
| 100 | 6 | 38 |

| PIXEL ROW 150 | PASS # 152 | JET # 154 |
|---|---|---|
| 101 | 5 | 26 |
| 102 | 4 | 14 |
| ⋮ ($d_2=49$) | | |
| 140 | 6 | 48 |
| 141 | 5 | 36 |
| 142 | 4 | 24 |
| 143 | 3 | 13 |
| 144 | 2 | 1 |
| 145 | 5 | 37 |
| 146 | 4 | 25 |
| 147 | 3 | 14 |
| 149 | 2 | 2 |
| ⋮ ($d_1=49$) | | |
| 188 | 2 | 12 |
| 189 | 5 | 48 |
| 190 | 4 | 36 |
| 191 | 3 | 25 |
| 192 | 2 | 13 |
| 193 | 1 | 1 |
| 194 | 4 | 37 |
| 195 | 3 | 26 |
| 196 | 2 | 14 |
| 197 | 1 | 2 |
| ⋮ ($s=4$, $n=8$) | | |
| 235 | 3 | 36 |
| 236 | 2 | 24 |
| 237 | 1 | 12 |
| 238 | 4 | 48 |
| 239 | 3 | 37 |
| 240 | 2 | 25 |

*Fig. 11*

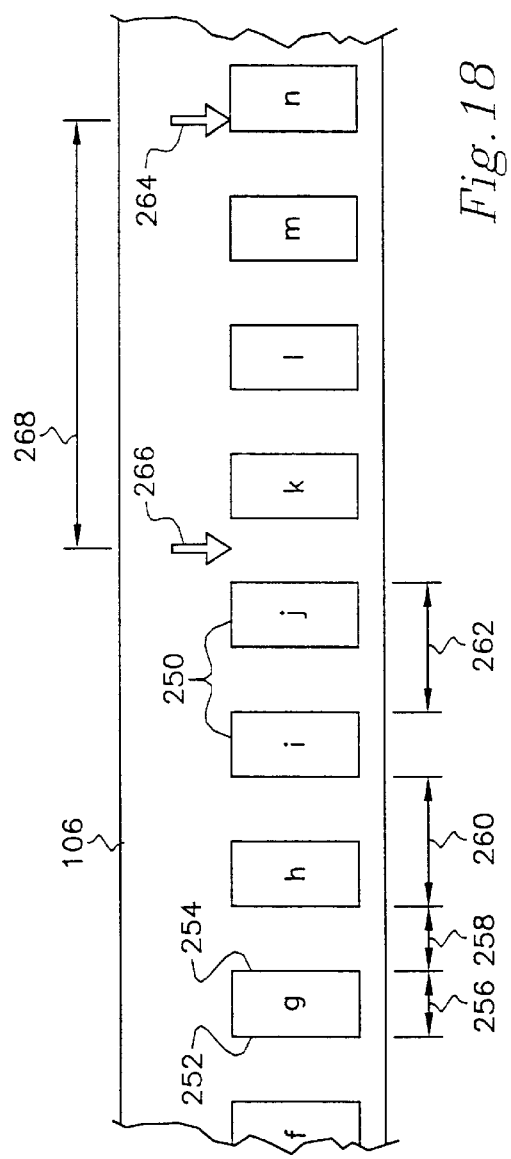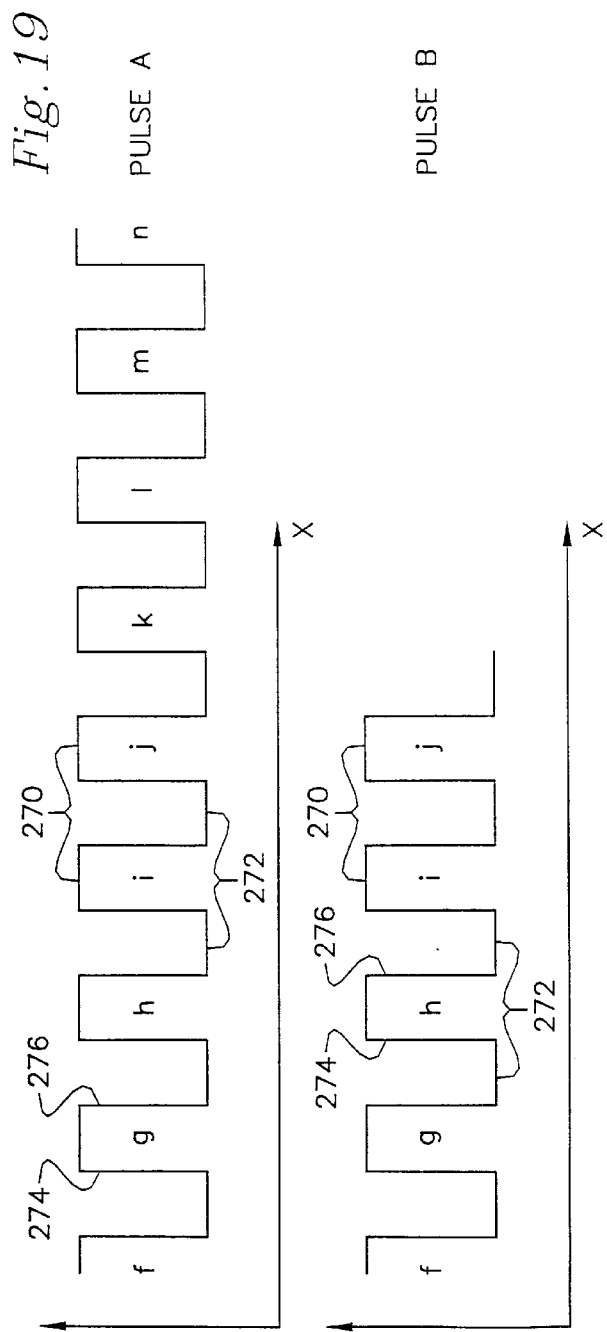

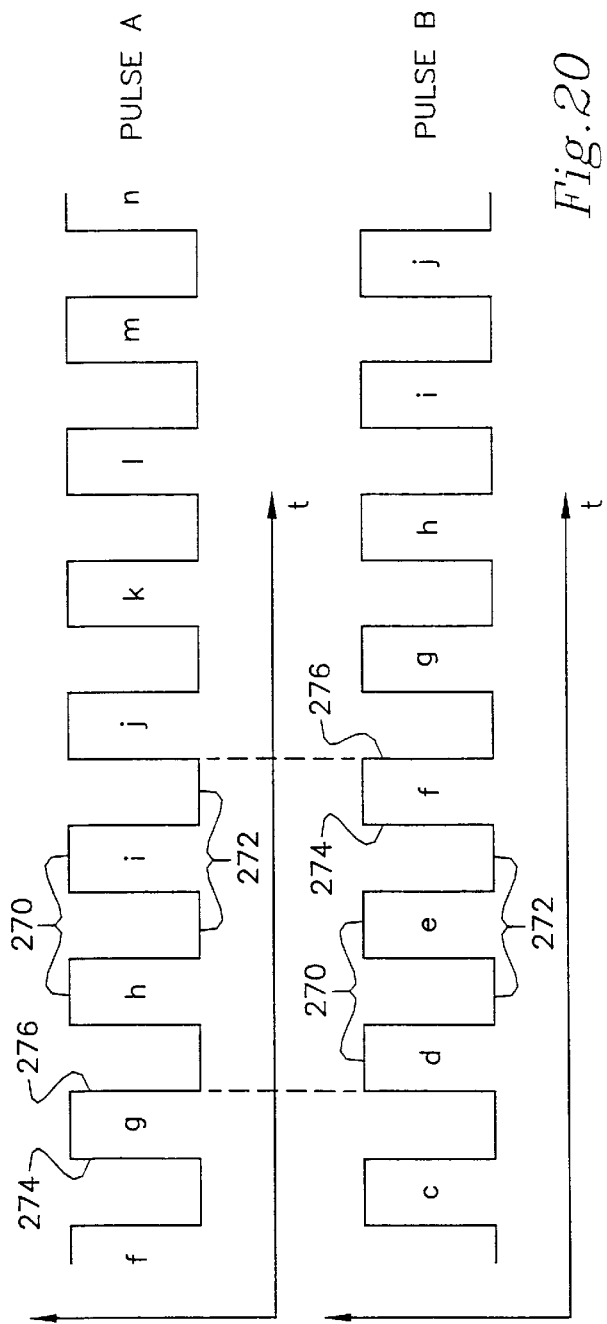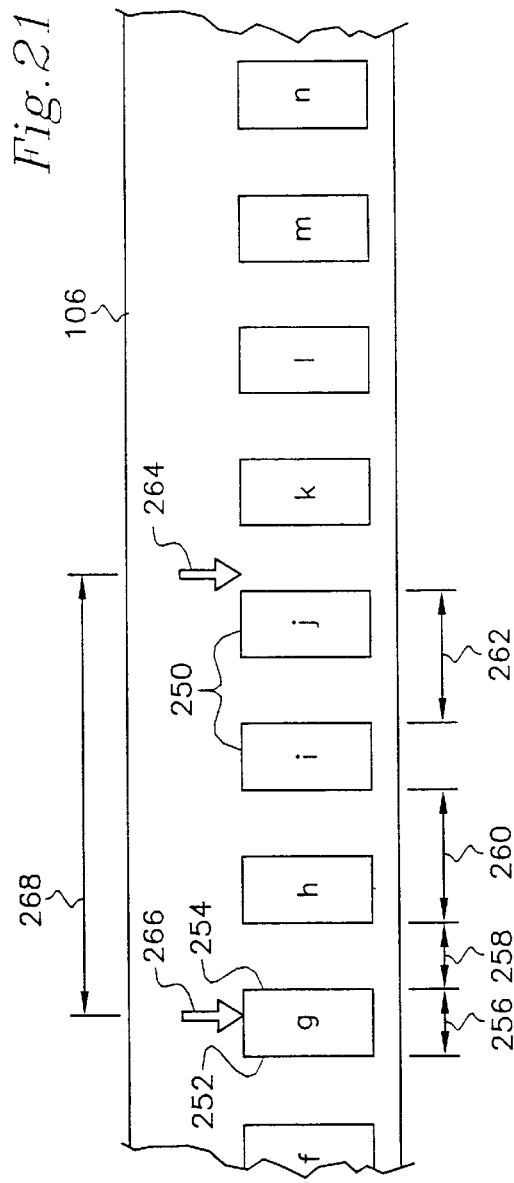

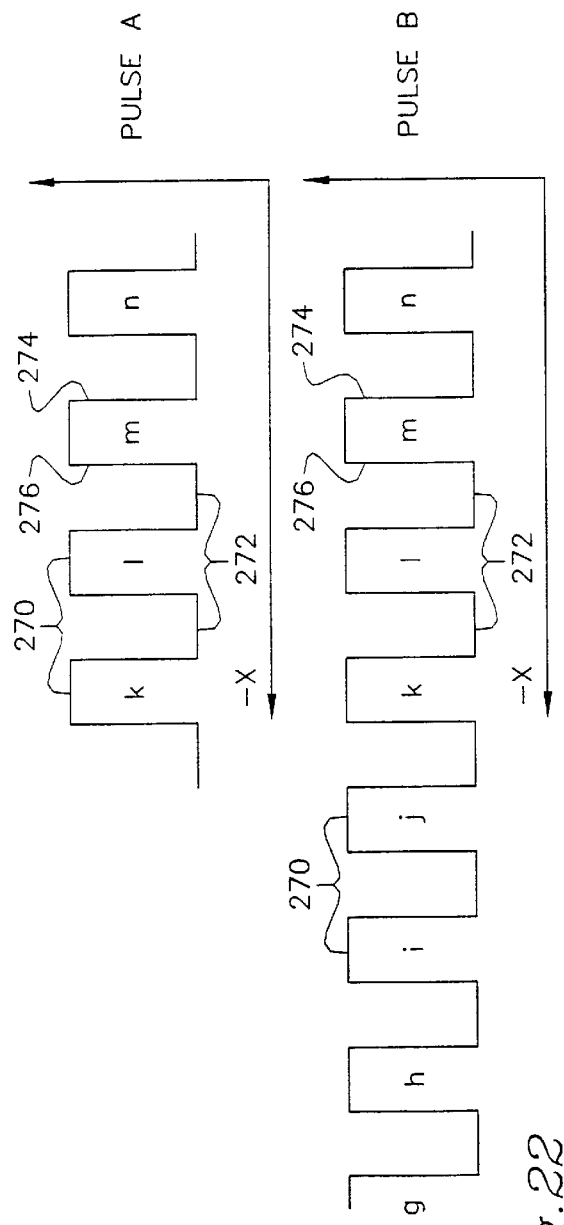
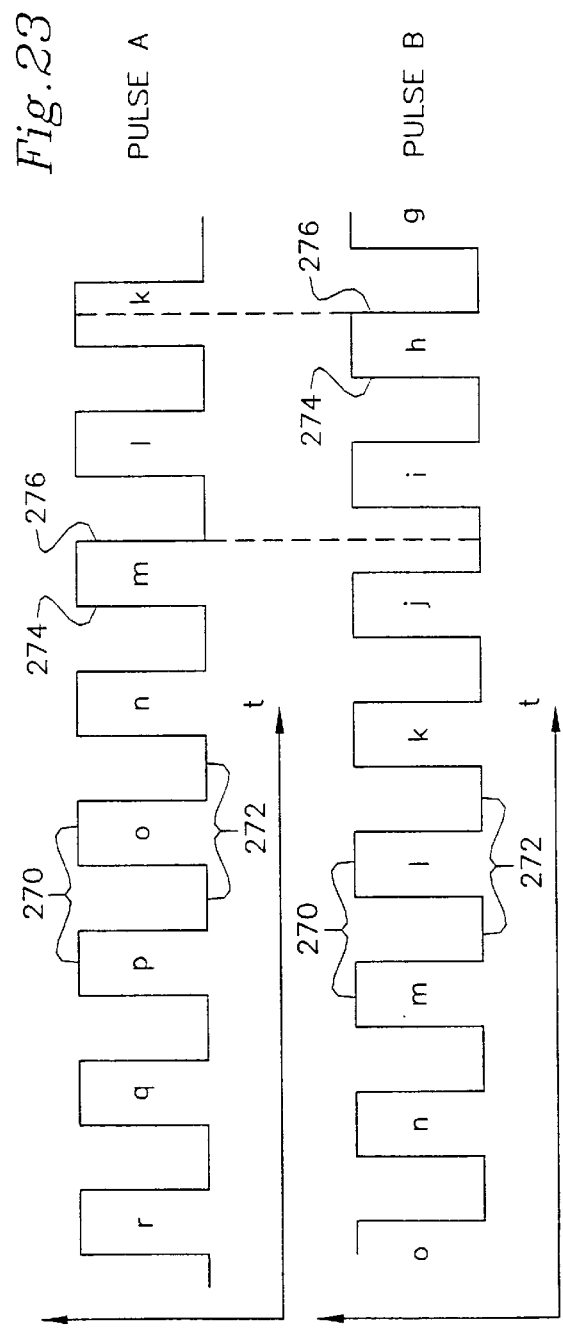

INK JET PRINTER WITH VARIABLE ADVANCE INTERLACING

BACKGROUND OF THE INVENTION

This invention relates to ink jet printing systems, and, more particularly, to a new and improved interlacing technique which involves advancing the printing medium in varying step sizes. The variable advance interlacing addresses numerous problems of prior art printers. The variable advance interlacing also addresses numerous problems discovered in the design of very large format, graphics quality digital imaging printers that use scanning ink jet print heads.

Ink jet printing involves placing a number of tiny ink droplets formed by one or more ink jets onto particular locations on the printing medium. The ink droplets solidify or dry on the printing medium, forming small dots. Any number of these small dots, when perceived some viewing distance away from the paper, are perceived as a continuous tone visual image. Both text and graphic images may be printed with ink jet printing.

The printed image from an ink jet printer is made up of a grid-like pattern of potential dot locations, called picture elements or "pixels". For many smaller-format documents commonly viewed from 1–6 feet away, the ink jet printing industry has produced printers having a print resolution of between 200 and 300 pixels per inch (40,000–90,000 pixels per square inch) and a maximum media width of 24 inches. The print resolution for other applications may vary as need, and thus for printing a billboard, commonly viewed from hundreds of feet away, the pixel size may be on the order of 6–12 pixels per inch.

Presently there are two primary types of jets which can be used in ink jet printers. Thermal ink jets use a thin-film resistor to vaporize a small portion of ink and create a minute bubble within the ink. The bubble forces a small droplet of ink through the jet nozzle. Piezo-electric jets use a substrate which is electrically pulsed to create a pressure wave which in turn shoots a droplet of ink through the jet nozzle. A method of making a piezo-electric ink jet is taught in U.S. Pat. No. 5,265,315 to Hoisington et al., which is incorporated herein by reference.

Ink jet printers may further be classified as "on demand", for which ink droplets are formed only for the particular pixel locations needed, or as "continuous", for which ink droplets are formed at each pixel location, but some droplets are deflected away before they contact the paper. Additionally, the inks used in ink jet printers may vary.

Ink jet printer systems may use one or more of several different types of ink. Some ink jet printers utilize aqueous inks prepared with water or other solvents which are liquid at room temperature but dry after the ink has been applied to the printing medium. Ink jet systems may alternatively use "hot melt" inks, which contain little or no solvent and are solid at room temperature but are applied in a heated liquid state and then effectively frozen onto the paper surface. One such hot melt ink is taught in U.S. patent application Ser. No. 08/337,295, now U.S. Pat. No. 5,574,078, entitled THERMAL COMPOSITIONS, by Elwakil, filed on even date herewith and assigned to the assignee of the present invention and expressly incorporated herein by reference. Ink jet systems also may alternatively use semi-liquid or semi-solid inks, which are semi-liquid or semi-solid at room temperature but are liquified when heated. Such non-aqueous inks are generally known as "phase-change" inks. The present invention applies equally to all these various types of ink jet printers, but is particularly contemplated for on demand, piezo-electric, hot melt ink jet printing.

Color ink jet printers typically use the four subtractive primary colors, cyan, yellow, magenta and black ("CYMK"). Color blending of these four ink colors is achieved through two mechanisms. First, the ink jet printer may lay down multiple colors of ink on the same pixel location, thus combining ink colors at that pixel. The particular color combination caused by having multiple ink colors at a particular pixel location may be affected by the order of printing the various colors, as well as the homogeneity (or non-homogeneity) of ink mixing.

Second, when viewed at a distance, the eye will blend colors from adjacent pixel locations. Thus, for instance, a number of exclusively magenta and yellow dots may be laid down in an area of the image, with no pixel location receiving two colors of ink. Rather than perceiving individual magenta and yellow dots, the eye will blend the adjacent dots to perceive an orange image. In practice, ink jet color printers use both ink blending at particular pixel location and perception blending across pixel locations to create various colors and shades. Often a substantial number of the pixels of the image will go without having a dot of ink placed on them. This allows the perceived visual image to have a proper lightness/darkness or value. Through both forms of color blending, ink jet printers using only four colors of ink can visually reproduce full color images.

Ink jet printers generally move a print head containing the ink jets horizontally across the print image, while advancing the paper lengthwise in between successive passes or scans of the print head. To increase the rate of printing, numerous jets per color have been used to create a wider print head swath or "stroke". Prior ink jet color printers have utilized a single head having 64 linearly aligned jets. To print with four (CYMK) colors, four sets of 16 adjacent jets are each supplied with one of the ink colors to print 16 rows of pixels of each color. Each jet is vertically offset one pixel from the adjacent jets. With this previous 64-jet printer, the paper advance is 16 pixels after each scan (i.e., one quarter of the width of the 64 pixel print stroke), such that each scan of the printer head orients a jet of another ink color over each pixel row printed in a prior color.

Ideally, ink jet printing would occur by vertically-aligned (i.e., aligned in the direction of paper travel, perpendicular to the direction of print head travel) printer jets each mounted one pixel beneath the preceding jet. However, present printer head technology limits the minimal spacing between jets. For instance, piezo-electric jets of the type discussed in U.S. Pat. No. 5,265,315 to Hoisington et al. are presently limited to approximately 0.027 inches spacing between adjacent jets, or approximately 37 jets per linear inch. Ink reservoir/firing chamber space is presently the critical factor in preventing closer spacing. To attain 37 jets per linear inch spacing, chambers are alternately located above and below the jets. Resolution of 37 dots per inch is quite unsatisfactory in reproducing closely-viewed visual images of sufficient resolution to produce a pleasing visual effect, such as for graphics-quality, large format output.

To achieve a higher print resolution, prior art linear jet arrays have been oriented at an angle in relation to the direction of print head travel, known as the "saber angle". By angling the linear jet array, the vertical spacing between jets becomes smaller, and the resolution of the resulting image is increased.

To meet the minimal required resolution of 300 dots per inch, the line of jets has been angled such that each jet is positioned approximately 1/300th of an inch vertically beneath the preceding jet. It should be noted that the horizontal spacing between jets should be a multiple of the vertical spacing between pixel rows, to aid in developing a grid pattern of pixel locations having matching horizontal and vertical resolutions. Because the vertical spacing between pixel rows is 1/300th of an inch, the horizontal spacing between jets should be a multiple of 1/300ths of an inch. Given the present spacing constraint of 0.027 inches between the jets, 1/300th of an inch vertical spacing leads to a horizontal spacing between jets of 8/300th of an inch. The prior art 8 to 1 ratio of jet spacing provides a saber angle of 7.125°.

Prior art scanning print head configurations, with numerous jets per color each mounted one pixel beneath the previous jet and printing in a full swath, predicate what is known as a "banding" problem. One type of banding occurs if the paper advance is not extremely accurate, such that the paper is advanced slightly more or slightly less than the width of the print swath or stroke (i.e., the vertical extent of the line of jets). That is, if the paper advances slightly too far a perceptible blank area will occur in the color pattern at the end of each paper advance, between the printed swaths. Alternatively, if the paper advance is too short, a perceptible darker area will occur in the color pattern at the beginning of each paper advance, where adjoining swaths overlap.

Other causes can further complicate the banding problem. With some printers, the direction that the print head is traveling for any given scan may affect the order that the different colors of ink are laid down on the paper. A different ordering of colors may create a slightly different hue when visually perceived. For instance, if one band is laid down from left to right with magenta over cyan on a significant number of pixels, and the succeeding band is laid down from right to left with cyan over magenta on a significant number of pixels, a slight color difference between the two bands may be visually detectable.

Banding may also be caused in part by the thermal characteristics of the printing scan. The top of the band may be laid down first, on a relatively cool piece of paper, whereas the middle and bottom of the band may be laid down on a paper heated by previous ink dots. This difference in heating can affect the ink flow characteristics and cause a visually perceptible difference between the top and bottom of the band.

Various methods have been attempted to compensate for the above-cited banding problems. For instance, in U.S. Pat. No. 5,075,689 to Hoisington, et al, banding was addressed by altering the arrangement of print jets out of a linear array. Another approach to banding, taught by U.S. Pat. No. 5,239,312 to Mema, et al., involves altering the spacing between jets on a print head. Both of these previous methods involve additional manufacturing costs in aligning the ink jets into a non-uniform pattern.

A third approach to banding is referred to as "multipass" printing. In multipass printing, the print media is advanced at a fractional increment of the vertical swath width, such that two or more jets of the same color pass over a pixel row on subsequent passes. The first jet will only print a portion of the dots on that pixel row, with remaining dots on the pixel row printed on subsequent passes. Multipass printing tends to mask paper advance errors such that they do not show up as discreet artifacts in the print output, but requires significant additional time in printing.

Ink jet printers often have problems in aligning the jets which are not easily correctable through mechanical manipulation of the head. These alignment problems become aggravated as the number of jets increase, as the spacing between the furthest jets increases during replacement of any other components of the print heads, and as the ink delivery and mechanical placement of print heads becomes more complicated. Alignment problems can largely be compensated by adjusting the data which controls the location of jet firing. Calibration techniques can be used to determine what adjustment is necessary.

Because differences in primary ink colors are easily detectable by the user and provide ready demarcation points relative to the print head, it is common to calibrate each of the four colors with respect to each other. For example, a print head may have a cyan set of jets which is nominally 384 pixels horizontally offset from the black set of jets (16 jets of each color times 8 horizontal pixels per jet times 3 color changes). A test pattern may be laid down by the cyan jets followed by test pattern laid down by the black jets. The test patterns may be compared to determine that, in actual operation, the black set of jets horizontally follows the cyan set of jets by 382 pixels. In such a case, the timing of the black set of jets may be adjusted by two pixel locations, so that patterns laid down by the cyan and black jets will better horizontally match each other. Vertical calibration can be carried out in a similar way. Because calibration is an important part of properly aligned printing, the ink jet printing industry continually seeks new and better ways to readily determine what calibration adjustments are needed.

Additional problems with prior inkjet head configurations involve the mounting of the print head for accurate placement and movement across the printed image. The rail structure for the print head must adequately support the print head not only over the entire printed image, but also for any cleaning, maintenance and other auxiliary functions of the print head. It is common to provide a zone, away from the printing medium within which to "park" the print head to perform auxiliary functions. These auxiliary functions may include cutting of the paper, manipulating ink supply, loading of the paper, certain calibration functions and cleaning of the print head. To accommodate the park zone, the support system, or rails, must support the head over a distance greater than the width of the printing medium. For example, printers handing printing medium about 11 inches wide (which accommodates the length of standard 8½×11 paper) may have rails about 17 inches long.

Accurate placement and movement of the print head becomes more and more difficult as the length of the print scan (i.e., the width of the image) increases. Most prior ink jet printers over about 17 inches wide employ either a two-rail structure, or a single-rail and outrigger structure, for head carriage X-directional travel. Both of these techniques provide two separate and independently adjustable support points for the carriage. Multiple support systems were used on wide printers because it was believed that a single rail could not provide adequate support and stability for the print head over a large distance. Multiple support systems were utilized to provide a wider support base for the print head and carriage to lessen the effect of any stability problems, as well as to provide additional strength to lessen rail flexing problems. Vibration problems may occur if the print head undergoes movement with respect to the rail structure. The print head may slightly rotate or shake about an axis parallel to the rails, causing the print head placement with regard to the paper surface to be inaccurate. Alternatively, the print head may slightly rotate or shake from side to side on the rails, perhaps due to the direction of print head travel. Side to side rotation causes the saber angle to slightly change, altering the placement of ink dots.

Dual support systems are not altogether feasible for graphics quality, large format printing because it is difficult to maintain parallelism of the supports across the entire width of the large format media. More particularly, each support introduces positional error, resulting in non-parallel guide paths for the carriage. Further, prior art two-rail systems employ a pair of circular rails, with the print head mounted on a carriage which is in turn mounted on the rails. The carriage is generally supported by circular sets of ball bearings wrapped around each of the circular rails. Non-parallelism of the rails introduces vibration through the ball bearings to the carriage, often causing instantaneous horizontal velocity errors. If the supports are not parallel, the rollers on the carriage will bind or have excess freedom at particular locations along the rails, and cause further stability and vibration problems. If bending of the rails occurs and the railings are not maintained completely straight, errors occur in positioning the print head. Additional problems occur due to the space that the rails take up, interfering with the transfer of electronics and ink from the printer housing to the print head. It will be appreciated that these problems are magnified as the length of the rail or rails becomes greater, as in large-format printing. Accordingly, a print head configuration is desired which will avoid these various problems.

One mechanism for cleaning the print head involves wiping the print head with blotter paper as described in U.S. Pat. No. 4,928,120 to Spehrley, Jr., et al. The Spehrley, Jr. blotter is provided in a replaceable plastic module. The Spehrley Jr. blotter has a top roller for pressing against the print jet orifices and a bottom roller for pressing against the bottom face of the print head when they are being wiped. While this blotter works acceptably, a less expensive method and apparatus for blotting is desired.

Ink jet printers also need a consistent, accurate method to determine when the ink jets should be fired based on the print head's location with respect to the image. Accurate positioning of ink dots on the printed image is necessary for accurate reproduction of the desired image. Prior art printers have optically sensed markings from an encoder strip to determine print head position. The encoder strip markings are intended to be consistently spaced across the travel of the print head. An encoder strip reader produces a signal as the print head changes location across the encoder strip, and the prior art ink jets are fired based directly on the timing of the encoder strip signal. Prior art encoder strips thus provide one way to determine when the ink jets should be fired.

However, various errors occur which prevent the encoder strip marking from corresponding exactly with the position of an ink dot on the image. These errors tend to be exacerbated as the speed of printing and size of output are increased. High-speed, large format printing requires a high degree of accuracy to generate quality graphics, and a more accurate method of determining when to fire the print head based on its location with respect to the image is desired.

SUMMARY OF THE INVENTION

The present invention is a print head configuration which avoids these various problems of the prior art. The print head configuration addresses banding through two related mechanisms, a 29.7° saber angle and 4 to 1, variable advance interlacing. The print head is provided with a saber angle of 29.745°, with vertical spacing of adjacent jets at ⅓₀₀ths of an inch (i.e., 4 pixels) and horizontal spacing at ⅞₀₀ths of an inch (i.e. 7 pixels). The total spacing between the jets at this saber angle is 0.027 inches. Prior art print heads having jet spacing of 0.027 inches and a 7.125° saber angle (previously contemplated for use at vertical spacing of 1 pixel and horizontal spacing of 8 pixels) may be utilized merely by mounting the print head on the printer at a 22.62° angle.

The print head configuration utilizes 4 to 1, variable advance interlacing. Because vertical spacing of adjacent jets is now ⅓₀₀th of an inch or 4 pixels, (i.e. no longer every pixel) adjacent pixel rows can now be printed on different scans of the print head, a method referred to as "interlacing". For instance, with a print head of 48 jets per color, series of advances of 49, 49, 45 and 49 pixels can be used. The print medium advances at the same overall rate as would be possible with the prior art saber angle, with full coverage, relatively constant advance printing.

In an alternative preferred embodiment, a 14° saber angle is used. Vertical spacing of adjacent jets at ⅔₀₆.₈₄ths of an inch (i.e., 2 pixels) and horizontal spacing at ⅛₃₀₆.₈₄ths of an inch (i.e. 8 pixels). With a print head of 48 jets per color, series of advances of 49 and 47 pixels can be used. Variable advance interlacing avoids or alleviates numerous banding problems of prior art printers.

BRIEF DESCRIPTION OF THE DRAWINGS

FIG. 5 is a greatly enlarged view of a portion of the print jets on the print head configuration taken from area 5 on FIG. 3.

FIG. 6 is a greatly enlarged view of pixel targets on a printing medium during a first pass using the print head configuration.

FIG. 7 is a greatly enlarged view of pixel targets on a printing medium during a second pass using the print head configuration.

FIGS. 8A–F are a schematic representation of pixel row printing using a simplified print head.

FIG. 8G is a schematic representation of pixel row printing using the simplified print head with an alternate paper advance pattern.

FIG. 8H is a schematic representation of pixel row printing using the simplified print head with a second alternate paper advance pattern.

FIG. 11 is a schematic representation of pixel row printing using the print head configuration of FIGS. 5–7.

FIG. 18 is a greatly enlarged plan view of a portion of an encoder strip.

FIG. 19 is a graphical representation of the signal produced by a dual encoder strip reader moving from left to right, as a function of the x-location of each optical sensor.

FIG. 20 is a graphical representation of the signal of FIG. 19, shown as a function of time.

FIG. 21 is a greatly enlarged plan view of a portion of an encoder strip.

FIG. 22 is a graphical representation of the signal produced by the dual encoder strip reader moving from right to left, as a function of the x-location of each optical sensor.

FIG. 23 is a graphical representation of the signal of FIG. 22, shown as a function of time.

DETAILED DESCRIPTION OF THE PREFERRED EMBODIMENTS

Figure 1:
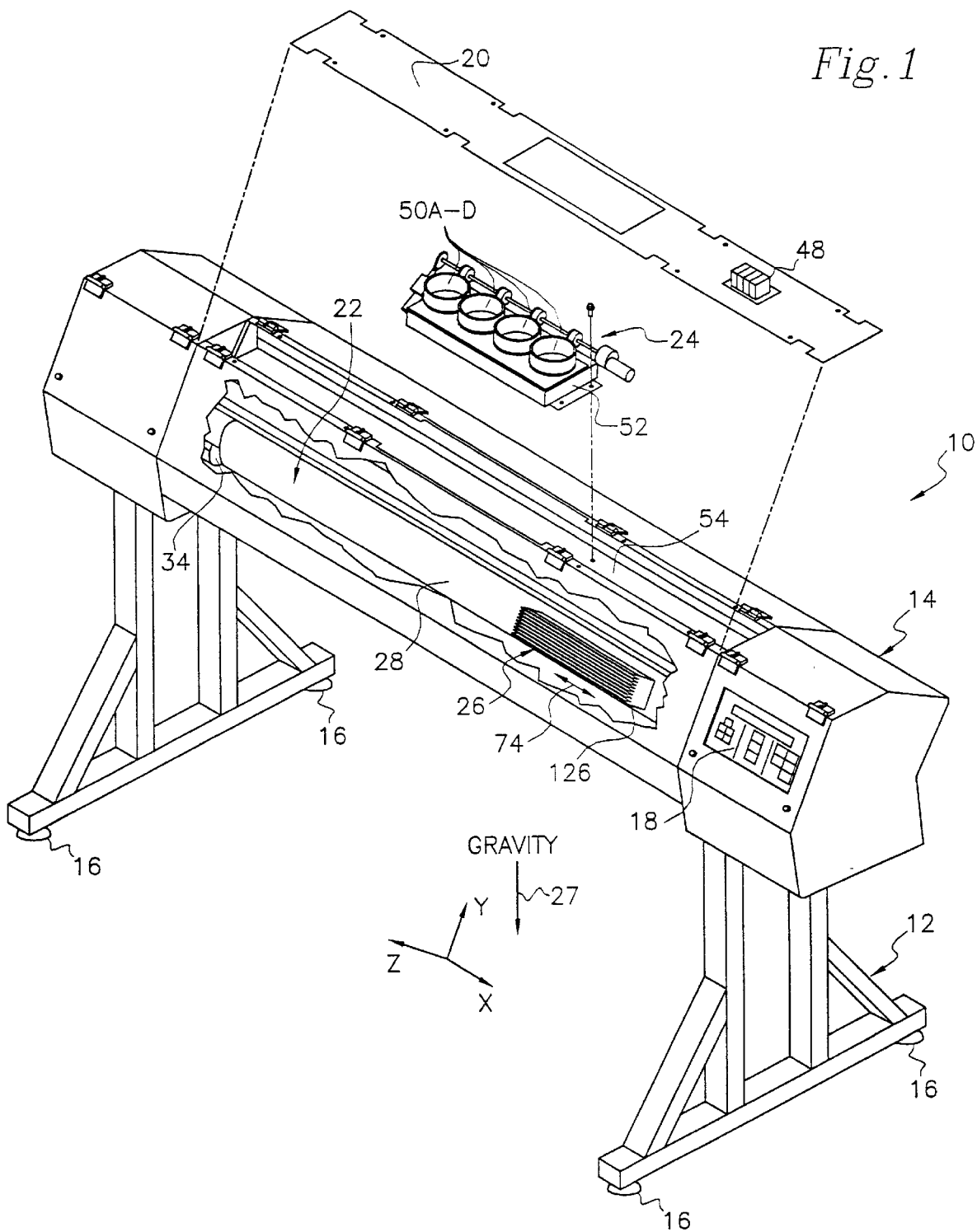
FIG. 1 is a perspective view of a four-color ink jet printer incorporating the print head configuration of the present invention.

FIG. 1 shows an overall perspective view of printer 10. Printer 10 is preferably a hot melt ink jet printer capable of handling 54 inch wide roll-feed media and printing at a minimum resolution of 300 dpi. As shown in FIG. 1, printer 10 includes stand 12 and housing 14. Stand 12 includes adjustable feet 16 for ease in levelling printer 10. Housing 14 includes control pad 18, and cover 20. Cover 20 may be removable for access to the internal components, or may be transparent in part to allow viewing of the printing operation. Workers skilled in the art will appreciate that various structures can be used to house printer 10 and the internal components therein. Internal to housing 14, (as shown by the broken out segment of FIG. 1), printer 10 includes paper handling system 22, ink supply system 24 and print head system 26 to print on paper or printing media 28. To simplify the description herein, printing medium 28 will be referred to as paper 28, but workers skilled in the art will appreciate that the printing medium can be any substance capable of receiving ink printing, such as paper, film (e.g., MYLAR), plastic, foil, cloth, vinyl, canvass, etc.

Figure 2:
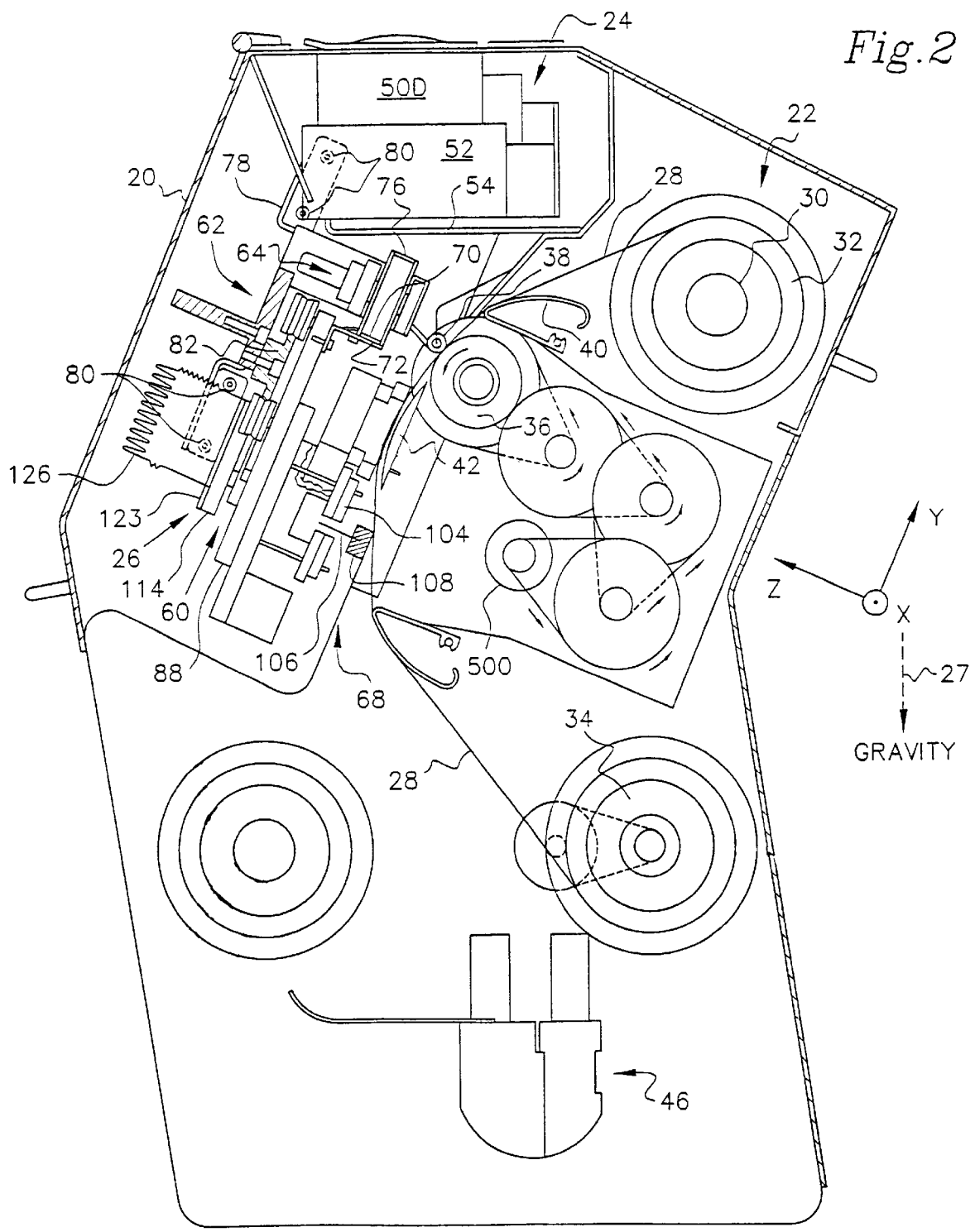
FIG. 2 is a side view of the ink jet printer of FIG. 1, showing the print head configuration in place, taken in the negative x-direction.

FIG. 2 shows a broad side view of these various paper handling 22, ink supply 24 and print head 26 systems. As indicated by directional reference 27, these internal systems generally operate at an angle relative to vertical. X, Y and Z axes are shown, with print head travel occurring along the X-axis, paper 28 travel occurring perpendicular to the X-axis and along the Y-axis, and the Z-axis being defined perpendicular to both the X-axis and the Y-axis. Printing can occur in any directional orientation of printer 10, but the orientation shown by directional reference 27 is preferred both for gravitational effects and for permitting viewing of the printing operation. As shown, the x-y plane is preferably disposed at an angle of 10 to 30 degrees to vertical.

As best seen in FIG. 2, paper handling system 22 begins with supply spool 30 for holding paper supply roll 32 and ends with paper take-up spool 34. Paper handling system 22 includes a drive motor (not shown) which rotates a plurality of drive rollers 36 and a corresponding plurality of pinch rollers 38. The drive motor is preferably a servo-motor with an integral rotary optical encoder for position-feedback sensing. Guide panel 40, platen 42, cockle guard 44 and post heater 46 further serve to properly handle paper 28. Paper handling system 22 is described in further detail in U.S. patent application Ser. No. 08/331,109 entitled PRINTING MEDIUM MANAGEMENT APPARATUS by Erickson et al., filed on even date herewith and assigned to the assignee of the present invention and expressly incorporated herein by reference.

As best shown in FIG. 1, ink supply system 24 includes ink profiler 48, four individual upper reservoirs 50A–50D and lower reservoir assembly 52. Lower reservoir assembly 52 includes four individual lower reservoirs (not individually shown). The ink profiler 48 and ink reservoirs 50, 52 may be supported on horizontal shelf 54. Ink supply system 24 includes further transport and treatment apparatus (not shown) to properly provide ink to print head system 26. Ink supply system 24 is described in further detail in U.S. patent application Ser. No. 07/337,307 entitled LARGE FORMAT INK JET PRINTER AND INK SUPPLY SYSTEM by Erickson et al., filed on even date herewith and assigned to the assignee of the present invention and expressly incorporated herein by reference.

Print head system 26 includes carriage assembly 60 (shown in FIGS. 2–4), rail assembly 62 (FIGS. 2 and 14) and peripherals, such as drive motor assembly 64 (FIG. 2), blotter assembly 66 (shown in FIGS. 15–17) and encoder assembly 68 (FIG. 2). Carriage assembly 60 is mounted to drive belt 70 at mount 72, and drive belt 70 is driven by drive motor assembly 64. As shown by arrows 74 (FIG. 3), carriage assembly 60 is propelled back and forth (i.e., in the positive and negative x-directions) along rail assembly 62 by drive motor 64 and drive belt 70. Workers skilled in the art will appreciate that drive motor assembly 64 can be designed to appropriately control travel of carriage assembly 60. In the embodiment shown, drive belt 70 runs in a full loop in the x-direction and includes return belt segment 76. Good acceleration, deceleration and accuracy characteristics of drive motor 64 and drive belt 70 are important for adequate printing performance. The x-direction length of travel of carriage assembly 60 and drive belt 70 must be sufficient to transport carriage assembly 60 across the entire media width, as well as to any peripheral devices which may be mounted off to the side of paper 28, such as a print head maintenance station. An umbilical assembly (not shown) is connected between carriage assembly 60 and printer 10 to provide carriage assembly 60 with ink and electrical signal supplies.

Figure 3:
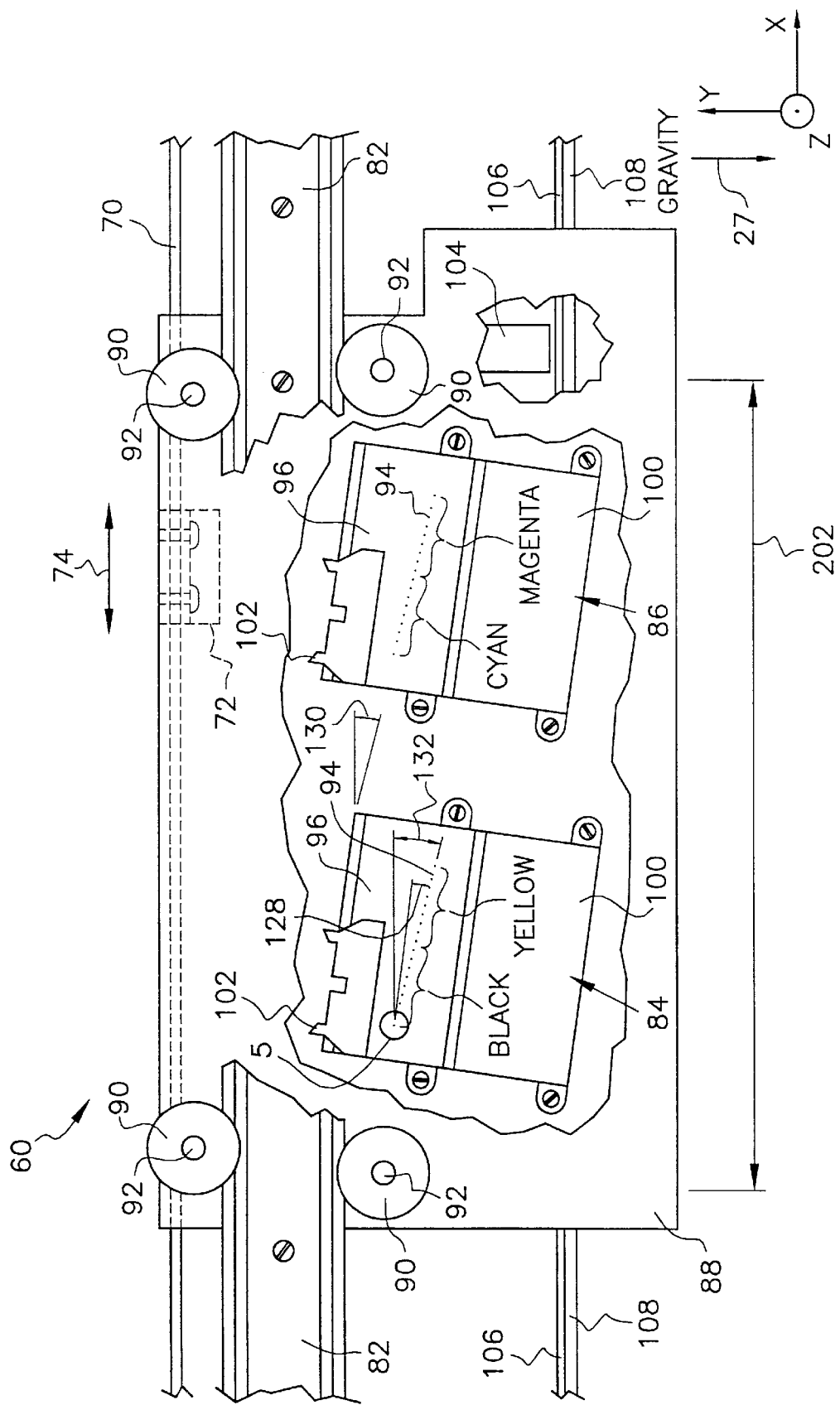
FIG. 3 is a fragmentary elevational view of the print head configuration of the present invention, taken in the negative z-direction.

Referring now to FIG. 3, carriage assembly 60 is shown, partially broken out, as viewed toward paper 28 (i.e., in the negative z-direction). Carriage assembly 60 preferably includes two printer heads 84, 86 mounted on carriage 88. Carriage 88 is mounted to rail 82 by rollers 90. Each of rollers 90 is attached to carriage 88 by bolt 92. As described above, drive belt 70 transports carriage assembly 60 back and forth in the positive and negative x-directions as shown by arrows 74.

Each printer head 84, 86 has an array or line of jets 94 across print face 96, each line 94 including 96 individual jets 98 (shown individually in FIG. 5). Ink jets 98 are preferably those shown in U.S. Pat. No. 5,265,315 to Hoisington et al., but may be of any type known in the art and having comparable spacing. The first 48 jets on printer head 84 are devoted to black and the following 48 jets in line 94 devoted to yellow. The other printer head 86 is similarly configured, with the first 48 jets devoted to cyan and the following 48 jets devoted to magenta. Other than being supplied by different ink colors, the two printer heads 84, 86 are substantially identical. Each printer head 84, 86 includes an ink supply structure 100 for at least two respective colors of ink, and a ribbon cable connector 102.

Encoder strip reader 104 is also mounted on carriage 88. As shown in FIG. 2, encoder strip 106 is held in encoder strip tensioner 108. Encoder strip tensioner 108 and encoder strip 106 run the entire length of travel for carriage assembly 60. Encoder strip 106 is preferably a mylar strip, image-set and duplicated, or photographically etched at 150.5 lines (i.e., 301 line edges) per inch. After this original construction, encoder strip 106 may then be appropriately tensioned and secured in encoder strip tensioner 108 to accurately position 150 lines (i.e., 300 line edges) per inch along the length of travel for carriage assembly 60. Encoder strip 106 is secured to encoder strip tensioner 108 along the entire length of encoder strip 106, and encoder strip tensioner 108 provides sturdiness and dimensional stability to encoder strip 106. Encoder strip tensioner 108 preferably clamps around a portion of encoder strip 106 such that encoder strip markings extend outward. Encoder strip tensioner 108 helps to eliminate any stretching or creep of encoder strip 106. Encoder strip tensioner 108 also helps to reduce thermal expansion or contraction of encoder strip 106. Encoder strip reader 104 can optically read encoder strip 106. With simple data manipulation of the output from encoder strip reader 104, the exact x-position of printer heads 84, 86 and jets 98 thereon can be known. It is preferable to mount encoder strip reader 104 and encoder strip 106 as close as possible to jets 98, and thereby minimize any positioning inaccuracies between these points. Encoder strip tensioner 108 keeps encoder strip 106 from sagging or bending such that encoder strip reader 104 will be positioned immediately adjacent encoder strip 106 through the entire length of travel of carriage assembly 60.

Figure 4:
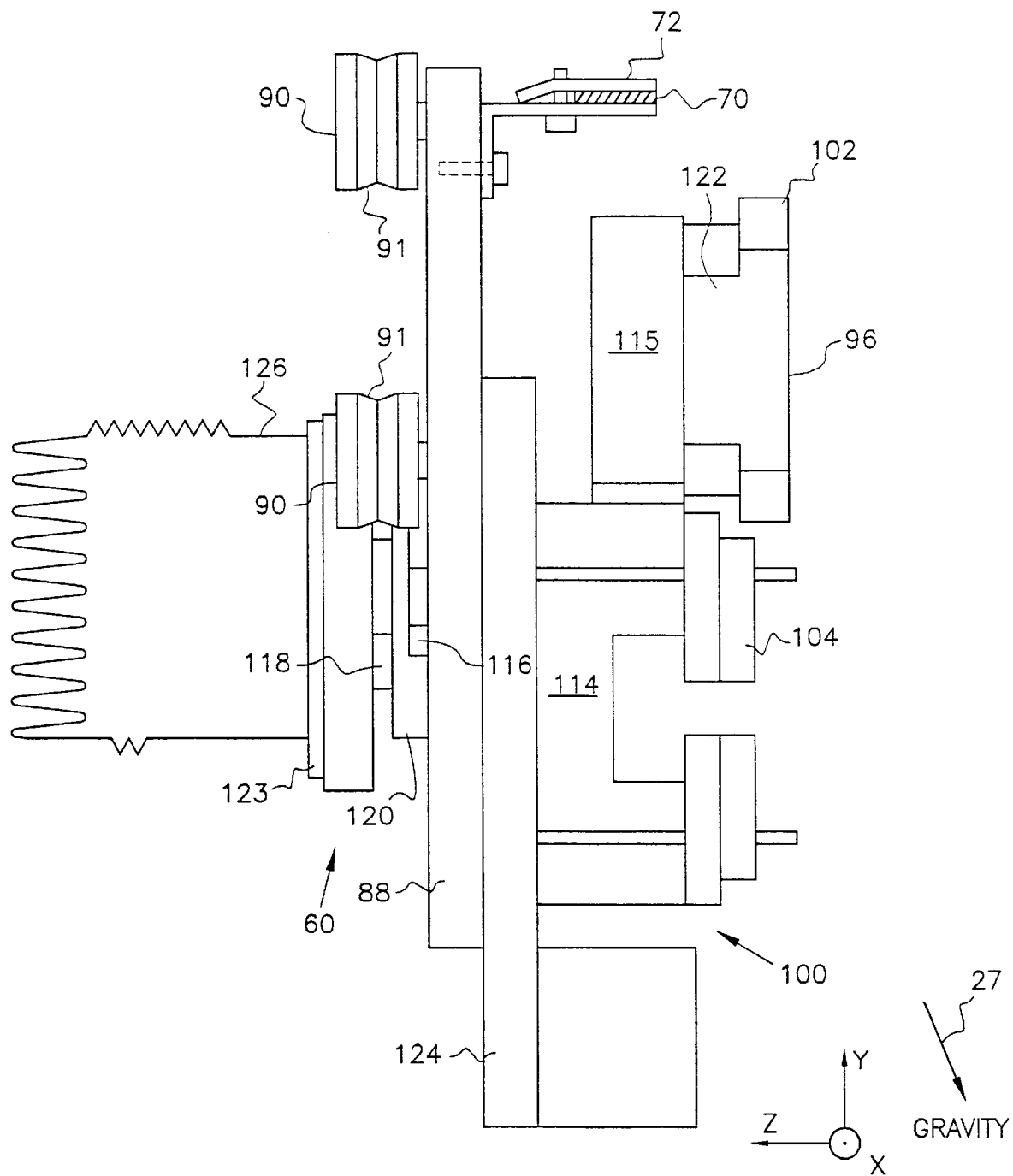
FIG. 4 is an enlarged side view of the portion of the print head configuration supported by the moving carriage.

FIG. 4 depicts an enlarged side view of the portion of FIG. 2 showing carriage assembly 60. Print face 96 with piezoelectric jets 98 (shown individually in FIG. 5) therein should be positioned for placement immediately opposite paper 28. Ink supply structure 100 includes reservoir 114. Lung 115 is provided on printer heads 84, 86 for proper de-aeration treatment of the ink. To the rear of ink reservoir 114, alignment pins 116 and thermal standoffs 118 separate ink reservoir 114 from circuit board 123. Umbilical connections 120 are provided to readily attach and detach the umbilicals (not shown) which supply ink to printer heads 84, 86.

Electronic circuitry 122 is provided on printer head 84, 86 to control piezoelectric jets 98, and a further circuit board 123 is provided to the outside of carriage 88. Ribbon cable connector 102 allows electronic communication to be readily attached and detached between the umbilical (not shown) and printer heads 84, 86 via a ribbon cable (not shown). The umbilical (not shown) thus connects electronic circuitry 122 and circuit board 123 and an external controller (not shown) for the entire system. All of this structure is mounted on mounting block 124 which rides on carriage 88. Heat sink 126 is disposed on the outside of circuit board 123 to aid in cooling of circuit board 123.

During operation of printer 10, printer heads 84, 86 print both when traveling in the positive x-direction and when traveling in the negative x direction. After each pass of carriage assembly 60 (i.e., regardless of carriage assembly direction), paper handling system 22 advances paper 28 in the y-direction.

SABER ANGLE

As can be best seen from inspection of FIG. 3, line 94 is canted with respect to printer head 84 at the prior art 7.125° angle 128. Under the previous arrangement, printer head 84 would be mounted square in comparison to the x-direction of travel 74, and the saber angle (e.g. the angle that the line of jets makes with respect to the x-direction of printer head travel) would be 7.125°. The present print head configuration does not mount printer heads 84, 86 square, but rather mounts printer heads 84, 86 at an angle 130 with regard to carriage assembly 60. In one embodiment, the angle 130 is 22.62°, and the addition of these two angles 128, 130 creates saber angle 132 for printer heads 84, 86 of 29.745°.

This saber angle, together with spacing between jets of approximately 0.027 inches, leads to vertical spacing of adjacent jets at $^{04}/_{300}$ths of an inch (i.e., 4 pixels) and horizontal spacing at $^{7}/_{300}$ths of an inch (i.e. 7 pixels). This 7 to 4 relationship, rather that the previous 8 to 1 relationship, means that only one out of every four rows of pixels will be printed for each pass of carriage assembly 60. Various methods may be used to adjust to printing on every row of pixels from the four row per pass spacing, including the variable paper feed interlacing described below. The width of the print stroke (for the same number of jets) is four times as wide as previous print heads. The 7 to 4 relationship further allows printer heads 84, 86 to remain as compact as feasible under present manufacturing and ink supply conditions.

Workers skilled in the art will recognize that there are many ways to mount jets 98 and printer heads 84, 86 to arrive at an identical or similar saber angle 132. For instance, jets 98 could merely be arranged on a print head at an angle between 29 and 30 degrees to the print head, and the print head mounted square to the x-direction of print head travel. The particular mounting system used is not important to the invention described herein, and a worker skilled in the art may choose any system of mounting which proves beneficial to his or her situation and/or effects the same result.

FIG. 5 depicts a greatly enlarged view of a portion of line 94 of jets 98. To describe the effects of a paper advance, we have numbered the jets 98 (only jets 1–15 are shown in FIG. 5). Jets 98 are aligned with uniform spacing 134 between adjacent jets 98. With the print head mounting previously described, each jet 98 is offset with an x-component 136 of seven pixels (i.e., $^{7}/_{300}$ths of an inch, or 0.023 inches) and a y-component 138 of four pixels (i.e., $^{4}/_{300}$ths of an inch, or 0.013 inches) from adjacent jets 98. This leads to the 29.745° saber angle 132. Each color of ink on the print head 84 has a similarly situated line 94 of jets 98.

In the alternate preferred embodiment shown in FIG. 3, printer heads 84, 86 are mounted at an angle 130 of 6.911° with regard to carriage assembly 60. The addition of this angle 130 with the prior art 7.125° angle creates saber angle 132 for printer heads 84, 86 of 14.036°. This places each jet 98 a horizontal distance of 0.0265 inches and a vertical distance of 0.0066 away from the adjacent jets 98, and allows square pixel printing of 306.84 dpi in both the horizontal and vertical directions.

VARIABLE ADVANCE INTERLACING

FIG. 6 shows a greatly enlarged section of paper 28 during a first pass of printer head 84. Present locations of jets 1 and 2 are shown in a dashed line 98, and during this first pass printer head 84 is traveling from right to left with respect to paper 28, as shown by arrow 74A. Jet 1 has passed over a line of targets or pixels 142, making up pixel row 142. Each of these targets 142 is one pixel apart. Jet 2 has similarly passed over a line of pixels 144 spaced one pixel apart horizontally making up pixel row 144. Because the jets are spaced four pixels apart in the y-direction as shown by y-component offset 138, pixel rows 142, 144 are spaced four pixels apart.

It should be understood that pixels 142, 144 are potential targets for an ink jet 98, and not necessarily dots of ink on the printing medium. The actual dots of ink deposited by jets 98 may have a uniform size substantially larger than the targets 142, 144 depicted, or may have a size which varies from dot to dot. Additionally, ink dots are not generally placed at every pixel 142, 144. The amount of ink, the color or color combination of ink, and whether ink is to be placed at all are determined by software to accurately reproduce a full color image.

After the first pass is complete, paper 28 is advanced 47 pixels downward. FIG. 7 shows the same area of paper as FIG. 6 during a second pass of printer head 84. Printer head 84 is moving from left to right during this second pass, as shown by arrow 74B. The full pixel rows 142, 144 (representing whatever ink dots have been deposited there), are shown. After a 47 pixel paper advance, jet 13 (12 jets/48 pixels below jet 1 on printer head 84) is one pixel below pixel row 142. Jet 13 passes over pixel row 146. Similarly, jet 14 is one pixel below pixel row 144, and passes over pixel row 148. After two additional passes, the entire pattern of potential pixel targets have been covered by jets 98.

As will be described below, various sequences of variable paper advance can be used. In one embodiment, a paper advance series of 49, 49, 45 and 49 pixels will position printer head 84 at a location which is a full print stroke (192 pixels) beneath the first pass, having covered the entire pattern of potential pixel targets. Larger images are reproduced merely by continuing out the pixel target array through more passes of printer head 84. The paper advance continues at 49, 49, 45 and 49 pixels until the end of the image.

The disclosed print head and variable paper advance configuration has several advantages over the prior art which can be shown through schematic diagrams of simpler arrangements embodying individual features of the present invention. For simplicity, the example above and these schematics are explained for only a single color, however it is understood that an identical procedure may be utilized for additional colors to be laid down on paper 28. Throughout schematic FIGS. 8A–11, column 150 indicates pixel row addresses in an image. Column 152 indicates which pass of the print head the pixel row is printed on. Column 154 indicates which jet of the print head passes over a particular pixel row. Workers skilled in the art will appreciate that the orientation of the image and the numbering of the jets may be altered without changing the overall effect of the invention or the importance thereof. The numbering of jets, passes and pixels rows in these examples is for illustration purposes only.

FIGS. 8A–F represent a schematic representation of pixel row printing using a simplified print head. The simplified print head has four jets (n=4) which are each spaced a uniform Y-component of four pixels apart from adjacent jets (s=4). The image represented in FIGS. 8A–F has 36 pixels in the Y-direction, and can be as wide in the X-direction as permitted by the length of travel of the print head. As represented by FIG. 8A, the paper is advanced until the bottom of the image begins to pass underneath the print stroke, thus the first pass of the print head places jets 1 and 2 over the very bottom of the image to be printed. With the direction of paper feed, it is to be understood that the bottom portion of an image is printed prior to continuing up in printing higher pixel rows. Jet 1 prints pixel row 32, while jet 2, 4 pixels below jet 1, prints pixel row 36.

FIG. 8B represents a second pass of the print head after the paper has been advanced 5 pixels. This paper advance has placed jet 1 over pixel row 27, jet 2 over pixel row 31, and jet 3 over pixel row 35.

FIG. 8C represents a third pass of the print head after the paper has been advanced another 2 pixels. Each of the jets 1, 2 and 3 are located 2 pixels higher on the image than during the preceding pass.

FIG. 8D represents the printing image during a fourth pass of the print head after the paper has been advanced another 3 pixels. It is not until this fourth pass of the print head that jet 4 is actually located over the printed image. The 3 pixel paper advance has placed jet 4 over pixel row 34, thus completing the lowest portion of the image.

FIG. 8E represents a fifth pass of the print head after a 6 pixel paper advance.

FIG. 8F represents the image after the entire image has been printed. The series of paper advances, 5/2/3/6 pixels respectively, has completely filed in the image. The identical series of advance may be repeated continually to print an image of any size in the Y-direction.

The schematic of FIG. 8F readily shows both the series of advance ($d_1=5, d_2=2, d_3=3, d_4=6$) by identifying the location of jet 1 during consecutive passes of the print head. FIG. 8F also readily shows the spacing between jets (s=4) and the number of jets (n=4) by identifying the location of each jet during a particular pass of the print head, (in this case, pass 8). Review of FIG. 8F will reveal that the spacing between jets and the number of jets is constant and uniform through printing of the image, and the entire image is printed merely by altering the distance of paper feed (d).

It will be recognized that the paper advance series continually repeats itself, such that any of the advances may be selected as $d_1$. In the case of FIG. 8F, while we have selected $d_1=5$ as the first advance in the series, $d_1$ could be any of the advances of 2, 3 or 6 pixels. It should also be recognized that the order of paper advances is not necessarily exclusive. In the case of FIG. 8F, the paper advances could be 5, 6, 3 and 2 pixels with the same result.

FIG. 8G is a schematic representation of pixel row printing similar to FIGS. 8A–F, but using a different paper advance. In this alternative paper advance, ($d_1=5, d_2=5, d_3=5, d_4=1$). The alternative paper advance pattern of FIG. 8G also covers the entire image without any two jets passing over the same pixel row. However, the paper advance pattern of FIG. 8G is slightly less beneficial than the paper advance pattern of FIG. 8A–F. Because the fourth paper advance in FIG. 8G is only one pixel, several adjacent pixel rows are printing by the same jet (rows 4 and 5; 8 and 9; 12 and 13; 16 and 17, 20 and 21; 24 and 25; 28 and 29; 32 and 33). This provides a higher chance that a viewer might detect a paper advance error about these rows.

FIG. 8H represents a third paper advance pattern using the same simplified print head. In FIG. 8H, ($d_1=3, d_2=3, d_3=3, d_4=7$). This paper advance pattern avoids having any two adjacent pixel rows being laid down by the same jet, and further has relatively uniform paper advances.

Additional modified series of paper advance could also prove useful with the simplified print head configuration represented in FIG. 8A–H. The preferred paper advance series taught by this invention have some common similarities:

(1) Each of the paper advance series totals 16 pixels ($d_1+d_2+d_3+d_4=16$), which is the number of jets times the spacing between jets (n×s=16). Accordingly, one total series of advance will progress through one entire print stroke.

(2) Each of the paper advance series includes four advances, which is equal to the spacing between jets (s=4).

(3) For each advance, the total advance provided so far by the series, divided by the number of jets, provides a different remainder. For instance with the paper advance pattern of FIG. 8F of 5/2/3/6 pixel steps:

$d_1/n=5/4$ (remainder of 1);
$(d_1+d_2)/n=7/4$ (remainder of 3);
$(d_1+d_2+d_3)/n=10/4$ (remainder of 2); and
$(d_1+d_2+d_3+d_4)/n=16/4$ (remainder of 0).

Any series of advance which will fulfill these commonalities will allow the image to be totally covered without any two jets covering the same pixel row. Workers skilled in the art will appreciate that various series of paper advance will accommodate these commonalities. Workers skilled in the art will further appreciate that these commonalities should be modified based on the print head structure used and the desired goal sought, and that it is not essential to incorporate all the suggestions herein to practice the claimed invention.

Figure 9:
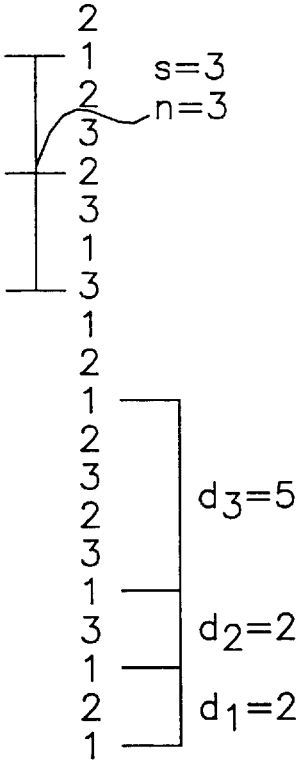
FIG. 9 is a schematic representation of pixel row printing using an alternate simplified print head.

FIG. 9 is a schematic representation of pixel row printing using a different simplified print head. The print head represented in FIG. 9 has three jets (n=3) with the Y-spacing between jets being only 3 pixels (s=3). The pattern of advance, 2/2/5 pixels will appropriately fill in the entire image without having any two jets pass over the same pixel row.

Figure 10:
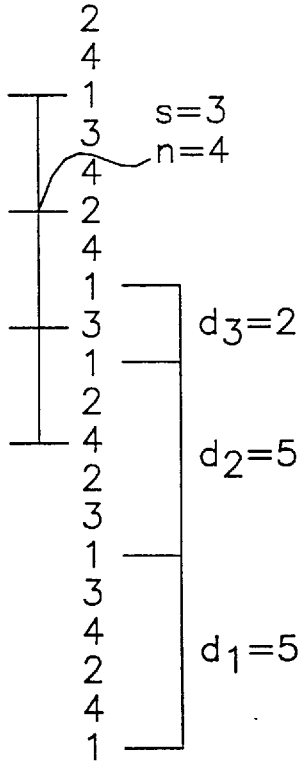
FIG. 10 is a schematic representation of pixel row printing using a second alternate simplified print head.

FIG. 10 is a schematic representation of pixel row printing with variable paper advance, with the print head having four jets (n=4) at 3 pixel spacing (s=3). In this case, a series of advance of 5/5/2 pixels suitably covers the image.

FIG. 11 is a schematic representation of pixel row printing using the print head configuration shown in FIGS. 5–7. The jets have been numbered 1–48, with 1 being the upper left jet on the print head and 48 extending through the lower right jet of a particular color on the print head. There are 48 jets of each color (n=48) and the spacing between jets equals 4 pixels (s=4). The paper advance sequence is ($d_1$=49, $d_2$=49, $d_3$=45, $d_4$=49). The paper is advancing at approximately 48 pixels per advance, or one-fourth of the print stroke, and accordingly during the first pass only jets 1–12 are located over the image. Because the jets are evenly spaced, four vertical pixels apart, jets 1–12 are targeted at every four pixels rows 193, 197, 201 . . . 233, 237 (i.e., 189+4j). After the first print head scan, the printing medium is advanced 49 pixels. This locates the first jet over pixel row 144 (193−49=144). Accordingly, the second pass of the print head, traveling in the negative x direction, locates jets 1–24 over pixel rows (140+4j). By advancing the paper subsequent advances $d_2$=49, $d_3$=45, and $d_4$=49, it can be seen that the present print head configuration will place the uniformly spaced print jets over each pixel on the image once and only once. By repeating the printing medium advance sequence of 49, 49, 45 and 49 pixels, a print head image of any size may be obtained while maintaining full efficiency of the print head. Each pixel location being covered once and only once, with no jets going unused while passing over the image.

The schematic of FIG. 11 represents an image having 240 pixel rows. As the preferred pixel spacing is 300 pixels per inch, this represents a vertical image having a height of only ⅘th of an inch. The preferred embodiment printer head 84 has a single color print stroke width of 192 pixels (48 jets×4 pixels spacing/jet=192 pixels). The schematic of FIG. 11 accordingly represents 1.25 times the width of one print stroke, even though 8 passes were required for full coverage.

This paper advance sequence, together with the 7 to 4 relationship between jets, provides a number of advantages. Firstly, because the print stroke is four times as wide as compared to previous saber angles and covers an area through four passes, any error caused by slight variations in paper advance are averaged over a wide section of print, rather than occurring as discreet edges between solid printer strokes. Because any error in paper advance now occurs across of wide range of pixels, rather than between two uniform arrays of pixels, any positioning errors are much less visually perceptible. Because each area of the page is covered by four printer strokes, distinctions due to an inaccurate paper advance mechanism are largely hidden.

Secondly, each pixel row is printed in an opposite direction as adjacent pixel rows. The opposite direction of adjacent pixel rows can be verified in FIG. 11 by noting that the pass number for consecutive pixel rows alternates between odd (i.e. passes in one direction) and even (i.e., passes in the other direction). The opposite directions of adjacent pixel rows makes any directional banding problems (such as direction dependent ink dot shapes, ink mixing non-homogeneity, and differing order of ink lay down) occur at a very high frequency, making such problems difficult to visually perceive.

Thirdly, each printed pixel location is separated four vertical locations away from other pixel rows currently being printed. This allows for substantial dissipation of thermal effects through the intermediate three open pixel locations to reduce or eliminate thermal banding problems. Adjacent pixel rows have entirely solidified prior to printing intermediate pixel rows. Having adjacent jets print pixel rows which are four pixels apart further averages problems with the paper advance across a high frequency area of the paper rather then creating low frequency distinct edges.

Fourthly, each of the steps are relatively uniform. With the sequence of 49, 49, 45 and 49 pixels, each of the steps are within 3 pixels of the number of jets, and three of the four steps are within 1 pixel of the number of jets. The more uniform paper advance pattern tends to better hide any banding problems occurring therein. Inaccurate paper advance characteristics which may be caused by stretching, tensioning or other considerations are lessened or avoided. By advancing the paper at a relatively uniform step advance, the paper is similarly tensioned or stretched during the printing of each pixel row.

Finally, pixels rows printed by the same jet are spaced approximately ⅙th of an inch apart. The separation between pixel rows printed by the same jet tends to further provide somewhat of a soft brush effect rather than distinct differences between segments of the paper of the printed image, and particularly helps to hide problems of a single jet getting clogged or failing intermittently.

In an alternative preferred embodiment, with jets 98 arranged at a 14.036° saber angle, a repeating paper advance sequence of 47, 49 pixels is used. This pattern takes full advantage of the second, forth and fifth benefits discussed above, and partial advantage of the first and third benefits. The print stroke is twice as wide as compared to previous saber angles and covers an area through two passes, allowing some averaging of slight variations in paper advance and avoiding discreet edges between solid printer strokes. Each printed pixel location is separated two vertical locations away from other pixel rows currently being printed. This allows for dissipation of thermal effects through the intermediate open pixel location to reduce or eliminate thermal banding problems.

MULTIPLE PRINT HEADS

The printer 10 of the present invention allows for a significantly higher rate of printing than previously possible.

By using multiple printer heads such as the two printer heads 84, 86 and two colors per head shown, the capacity of on-head ink reservoir 114 (see FIG. 2 and 4) has been increased to 7–10 cc per color of ink. With the various ink handling and electronic transfer rates used, the dual-head system of the preferred embodiment of the present invention can achieve a 16 kilohertz drop rate (i.e., 16,000 firings per ink jet per second). With 48 jets 98 per color at this 16 kilohertz drop rate, printer 10 can print in excess of 3.0 million dots per second, for an average full color printing rate of about 512 in$^2$ per minute at the minimum resolution of 300 dpi. The dual heads 84, 86 retain a stroke width which is narrower than if all 192 jets 98 were aligned sequentially on a single head. The dual heads 84, 86 can be separately oriented on carriage assembly 60, and thus lines of jets 98 can be separately oriented with respect to each other.

However, multi-head printing creates problems for bi-directional printing due to a differing order of ink laydown. With the carriage assembly 60 shown in FIG. 3, black and yellow, with black on top, are the colors on printer head 84, and cyan and magenta, with cyan on top, are the colors on printer head 86. Due to the direction of paper feed, the top colors will always be printed first on a particular pixel row, beneath the second two colors. However, the ordering of the top colors and the ordering of the bottom colors on a particular pixel row (i.e, KCYM or CKMY) is dependent upon the direction of print head travel for that pixel row. With proper interlacing techniques and with adequate mixing of ink colors, no adjustment based on the ink order may be necessary. However, the present invention contemplates several addition methods to handle changing ink laydown orders.

Figure 12:
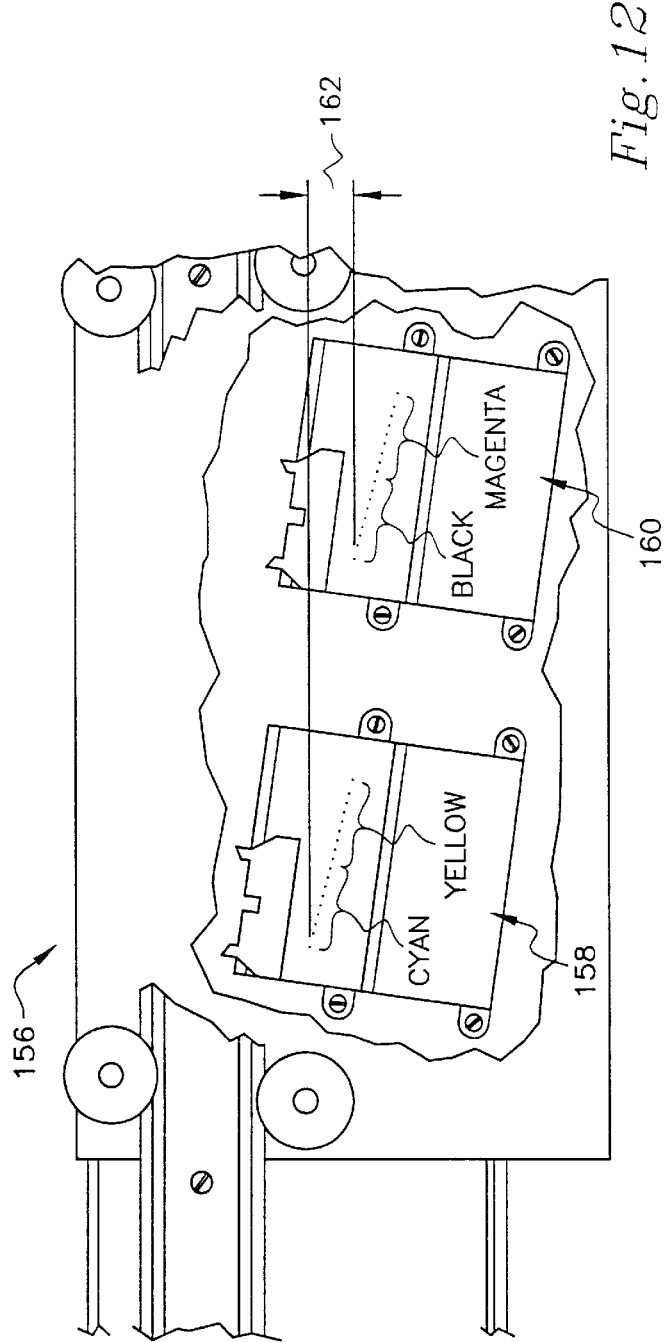
FIG. 12 is an elevational view similar to FIG. 3 of an alternate print head configuration, taken in the negative z-direction.

FIG. 12 depicts an alternative embodiment of carriage assembly 60 shown in FIG. 3. In the carriage assembly 156 shown in FIG. 12, printer head 158 has cyan ink supplied to the top 48 jets and yellow ink supplied to the bottom 48 jets. Printer head 160 has black ink supplied to the top 48 jets and magenta ink supplied to the bottom 48 jets. Moreover, printer head 160 is mounted at a position approximately ⅔rd of an inch (i.e., 192 pixels, or the Y-spacing for 48 jets) offset from printer head 158 in the Y-direction, as shown by offset 162. By mounting printer head 160 this distance and number of jets below printer head 158, cyan is always printed first and magenta is always printed last, regardless of the direction of print head travel. The order of printing is accordingly reduced to either CKYM or CYKM. Yellow and black are seldom printed on the same pixel location, and this print head configuration allows for consistent color reproduction without significant problems based on the direction of print head travel.

Additionally, in either the configuration of FIG. 3 or FIG. 12, multiple printer heads may have slightly offset alignment as necessary to adjust the relative pass timing between ink colors. For instance, in the configuration of FIG. 3, printer head 86 may be aligned to be one, two or three pixels lower than printer head 84. Similarly, in the alternative embodiment shown in FIG. 12, printer head 160 may be aligned 193 pixels, 194 pixels, or 195 pixels beneath printer head 158. Because of this slightly offset printer head alignment, ink dots laid down by one printer head will not be directly over the ink dots laid down by the other printer head during the same pass. If the printer heads have no offset in alignment, there is about a 0.02 second time differential between laying down dots of different colored inks over each other (that is, the time period for carriage assembly 60 to travel the horizontal distance between printer heads 84, 86 during a pass is about 0.02 seconds). Conversely, if a slight offset is used, this relative timing is drastically altered. As the later (top) ink will be applied on a subsequent pass of the carriage assembly 60 (perhaps several passes later), the time differential may be 1–10 seconds apart. Workers skilled in the art will appreciate that the optimal alignment offset between printer heads 158, 160 is dependent upon the mixing characteristics of the ink and the way multiple colors of ink interact with each other to reflect light, and may change based on the particular characteristics desired.

When the slight printer head offset is combined with variable advance interlacing, the timing differential and order of color laydown can be further altered. For instance, by using the configuration of FIG. 3 with a one pixel offset and 49, 49, 45, 49 pixel paper advance, three quarters of the pixel locations having both yellow and magenta will be printed with magenta over yellow, whereas only one pixel row out of every four will be printed with yellow over magenta. Similarly, three quarters of the pixel locations having both black and cyan will be printed with cyan over black, whereas only one pixel row out of every four will be printed with black over cyan. Workers skilled in the art will appreciate that the location of colors on carriage assembly 60, the printer head offset and the variable advance interlacing can be selected as desired to create the desired order of color laydown and desired timing differential between colors.

In an alternate preferred embodiment, with adjacent jets aligned 2 pixels apart in the y-direction, printer head 86 is aligned to be one pixel (i.e., 0.0033 inches) lower than printer head 84. This alignment has been noted to substantially correct thermal banding artifacts, and, correct use of variable advance interlacing reduces the color order laydown problems in bi-directional printing.

In a second alternate embodiment, with adjacent jets aligned 4 pixels apart in the y-direction, printer head 86 is aligned to be one pixel (i.e., 0.0033 inches) lower than printer head 84. A five step pattern is used for paper advance, with steps of 1, 1, 1, 1 and 188 pixels for a 48 jet per color head. During the first pass of the sequence, only printer head 84 is fired. During the last pass of the sequence, only printer head 86 is fired. With this configuration and advance sequence, each jet on printer head 86 prints over a pixel row printed by the jets on printer head 84 from the previous pass. Accordingly, the order of color laydown remains constant regardless of bi-directional printing.

Other similar series of advance could be used to the same effect, so long as the offset between printer head 86 and printer head 84 is equivalent to one or more of the previous step size. For instance, if printer head 86 is aligned to be offset 39 pixels from printer head 84, a series of advance of 39, 39, 39, 39 and 36 pixels could be used for 48 jet per color heads with 4 pixel offsets between jets. During the first pass of the sequence, only printer head 84 is fired. During the last pass of the sequence, only printer head 86 is fired. This configuration and advance sequence would similarly have each pixel row printed by printer head 84 prior to printing by printer head 86.

Still other variable advance interlacing schemes could be used with this strategy. For instance, with a 62 pixel offset between heads, 48 jets per color, 4 pixel offsets between jets, a series of advance of 27, 35, 27, 35, 27, 41 could be used. During the first and second pass of the sequence, only printer head 84 is fired. During the last two passes of the sequence, only printer head 86 is fired. This configuration and advance sequence would have each pixel row printed by printer head 84 two passes prior to printing by printer head 86, such that the order of color laydown is uniform in bi-directional printing. This configuration and advance sequence also has relatively even, non-identical advance distances.

Finally, software may adjust the amount of the relative colors to compensate for differences in print head direction (i.e., for which color ink will be placed above), so that proper coloring of the entire image is maintained despite differing ink orders. Either the proportion of dots of a particular color laid down may be altered, or the relative size of the ink dots may be altered as desired in software to compensate appropriately. Workers skilled in the art will again appreciate that this adjustment is dependent upon the mixing and light reflection characteristics of the particular ink colors.

AUTO-CALIBRATION ADJUSTMENT

Figure 13:
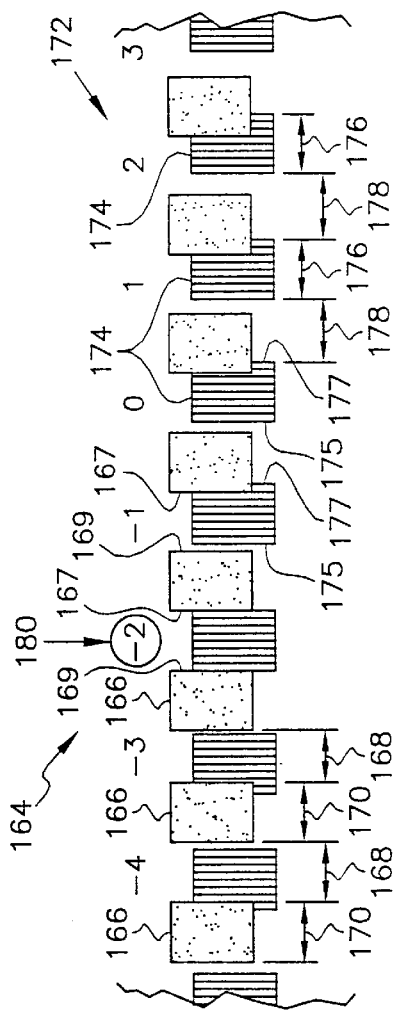
FIG. 13 is an enlarged calibration pattern for the print head configuration.

FIG. 13 is an enlarged calibration pattern 164 for the print head configuration. Calibration pattern 164 is used to calibrate horizontal timing of each color in relation to the other colors. A similar calibration pattern laid down in the vertical direction can be used to calibrate vertical placement of each color in relation to the other colors.

In creating calibration pattern 164 of FIG. 13, a pattern of marks or blocks 166 of a first color (in this case black) are laid down. Each of blocks 166 has a uniform distance 168 between them. Additionally, each block 166 has a leading edge 167, a trailing edge 169, and a uniform thickness 170 between leading edge 167 and trailing edge 169. With uniform distance 168 and uniform thickness 170, both leading edges 167 and trailing edges 169 are uniformly spaced. It is preferred that blocks 166 have a thickness 176 which is equal to distance 168 between them, such that blocks 166 shade in one-half of the area along the test pattern 164. Index 172 is also printed to designate calibration settings along calibration pattern 164.

A second row of blocks 174 is printed with a subsequent color (in this case, magenta) on carriage assembly 60. Second color blocks 174 each have a uniform thickness 176 between leading edge 175 and trailing edge 177. Thickness 176 is equal to the uniform distance 168 between first color blocks 166. The spacing 178 between second color blocks 174 is slightly different than the spacing 168 between first color blocks 166. As shown, the spacing 178 is one pixel greater than spacing 168. Because of this difference in spacing, the second color blocks 174 line up with the first color blocks 166 at a single location 180. This calibration location 180 is readily identified because blocks 166, 174 completely shade this section of test pattern 164. This calibration location 180 is similarly identified as the only location wherein leading edge 175 of second color block 174 lines up with trailing edge 169 of first color block 166. The remainder of test pattern 164 has blocks 166, 174 which extend over each other so as not to completely shade pattern 164.

Alternatively, calibration pattern 164 may be printed such that the proper calibration location occurs where second color blocks 174 completely overlay first color blocks 166. In this case, the calibration location may be identified as the only location wherein leading edge 175 lines up with leading edge 169 of first color block 166, and no unshaded portion of second color block 174 is seen to either side of first color block 166.

Calibration pattern 164 can be read either by the user or by automated equipment (not shown). Automated equipment for reading calibration pattern 164 may merely determine the percentage of shading as a function of location on calibration pattern 164. Similar calibration patterns can be laid down for the calibration for the remaining colors, both vertically and horizontally. In contrast to previous calibration techniques, overlaying the calibration marks and total shading provided by the proper setting leads to a significantly easier determination of the proper calibration setting. It should be noted that blocks 166, 174 may be printed by the same printer head or by different printer heads, depending on which colors are being calibrated. It should further be noted that multiple passes of carriage assembly 60 may be required to print blocks 166, 174. Numerous jets 98 may be used in printing blocks 166, 174, as well as numerous advances of paper 28. By properly choosing the size and orientation of blocks 166, 174, calibration may be achieved between various jets 98 as well as between various paper advances.

Upon determining the proper calibration location 180 for each color (both horizontally and vertically), the calibration location 180 can then be adjusted in software to alter the firing of jets 98. For instance, if the proper calibration of the second color is 2 horizontal pixels off, the second color may be fired 2 pixel locations earlier (or later depending on the direction of print head travel) during the print head pass. Similarly, if the proper calibration of the second color is 1 vertical pixel off, the information fed to the second color jets may be modified such that they print one pixel lower within the image. The proper calibration information may further be extrapolated to make corrections amid lines of same color jets 98. In this way, for instance, the first 24 black jets may be adjusted by one pixel relative to the second 24 black jets, so as to calibrate saber angle 132 to higher accuracy.

RAIL ASSEMBLY

Figure 14:
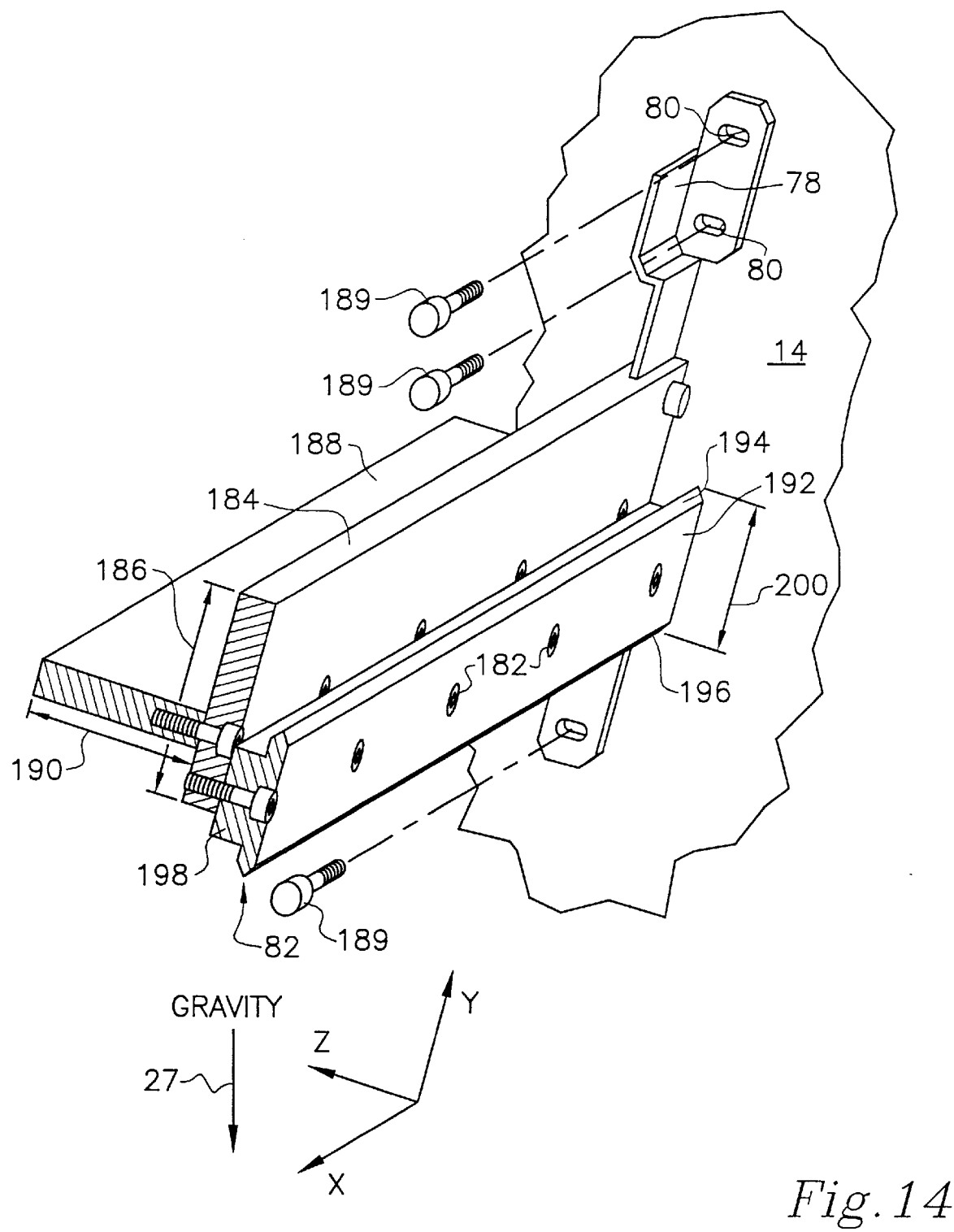
FIG. 14 is a enlarged perspective/cross-sectional view of the rail system of the print head configuration of the present invention in the negative x direction.

FIG. 14 depicts a portion of rail assembly 62 in perspective view. A number of attachment bolts 182 are shown securing rail 82 to attachment plate 184. Attachment plate 184 extends a significant distance in the y-direction as shown by height 186, such that attachment plate 184 will withstand the y-direction load of carriage assembly 156 without bending. Height 186 of attachment plate 184 in the y-direction is preferably in excess of 2 inches. Z-stiffener bar 188 is welded or otherwise securely attached to attachment plate 184, and extends a significant distance in the z-direction as shown by width 190. Width 190 of z-stiffener bar 188 is preferably in excess of 2 inches. Z-stiffener bar 188 provides additional stiffness in the z-direction, such that attachment plate 184 will withstand the z-direction load of carriage assembly 60 without bending. As shown in FIG. 2, carriage assembly 60 includes four rollers 90 to attach carriage assembly 62 to rail 82 for travel in the x-direction.

Rail assembly 62 may include end flanges 78. While only one end flange 78 is shown, it is understood that rail assembly 62 includes a similar end flange 78 at its other end. End flanges 78 include bolt holes 80 for ready attachment and detachment to housing 14 by suitable fasteners such as bolts 189. Attachment plate 184 and z-stiffener bar 188 extend in the x-direction in excess of the entire length of carriage travel, and only need be supported at their ends by end flanges 78. Attachment plate 184 and z-stiffener bar 188 are both preferably of aluminum, of sufficient thickness so as not to be overly heavy but to otherwise readily support the load of carriage assembly 60 without bending.

As shown in FIG. 14, rail assembly 62 has no structure restricting end 192 of rail 82. Accordingly, carriage assembly 60 can be simply removed off end 192 or rail 82 as follows. First, flange 78 is detached from housing 14, and opposite end flange 78 is loosened from housing 14. Carriage assembly 60 is released from drive belt 70 at mount 72. The entire rail assembly 62 is slightly pivoted, allowing carriage assembly 60 to be taken directly off end 192 of rail 82 past housing 14. Alternatively, a hinge (not shown) may be used to attach plate 184 and z-stiffener bar 188 to end flange 78. Such a hinge would allow pivoting of rail assembly 62 without loosening of opposite end flange 78.

By having rail assembly 62 supported only at its ends, pivoting of rail assembly 62 is easier and can be performed more quickly. The other end (not shown) of rail assembly 62 may be similarly configured to allow carriage assembly 60 to be taken directly off the other end of rail 82 in a like manner. This ease of removing carriage assembly 60 greatly facilitates maintenance and replacement of carriage assembly 60 and/or component parts therein. The umbilical assembly (not shown) is further readily detachable from carriage assembly 60 at ribbon cable connector 102 and umbilical connections 120 (FIG. 4), allowing carriage assembly 60 to be readily and completely removed from printer 10. Workers skilled in the art will appreciate that various alternative mounting arrangements can be used for rail assembly 62, while still allowing ready removal of carriage assembly 60 off end 192 of rail 82.

Rail 82 is rigidly attached to attachment plate 184 through attachment bolts 182. Rail 82 is too small to be supported only at its ends and still carry the load of carriage assembly 60 without bending. Accordingly, enough attachment bolts 182 are provided throughout the length of rail 82 to prevent rail 82 from bending in either the y or z-direction anywhere along its length. Rail 82 is preferably made of rolled structural steel, and further has sufficient stiffness to prevent torsional bending under the load of carriage assembly 60. Rail 82 is a minimum of 1 inch wide and 0.25 inches thick. Rail 82, as attached in this manner to attachment plate 184, is strong enough to prevent bending or misalignment of greater than 0.001 inches while supporting carriage assembly 60 of up to 10 lbs across an 81-inch span.

Rail 82 includes upper tread surface 194 and lower tread surface 196 on body 198. As shown in FIG. 4, rollers 90 have corresponding treads 91 which ride on tread surfaces 194, 196. As will be explained, the single rail 82 and the attachment of rollers 90 thereto allow movement of carriage assembly 60 only in the x-direction, and permit no rotational movement or vibration of carriage assembly 60.

Upper 194 and lower 196 tread surfaces should be precision machined and toleranced so as to be parallel to each other throughout the length of rail 82. This precise parallelism prevents rollers 90 from binding or being loose anywhere along the length of rail 82. Additionally, because both upper 194 and lower 196 tread surfaces are provided on a single rail 82, problems with aligning multiple rails in parallel are avoided.

Upper tread surface 194 and lower tread surface 196 have a v-shape, and thus provide tread surfaces disposed at an angle. Tread surfaces 194, 196 accordingly provide bearing forces for rollers 90 in an axial direction (i.e., positive and negative z-direction) and a radial direction (i.e., positive and negative y-direction). As depicted in FIG. 14, tread surfaces 194, 196 are preferably disposed at 45° to the x-y plane. Providing both axial and radial bearing forces for rollers 90 could similarly be achieved by u-shaped upper and lower tread surfaces and conforming surfaces on roller treads 91, without surfaces disposed at an angle. However, v-shaped tread surfaces 194, 196 are less likely to bind or have loose sections than u-shaped tread surfaces, which would require parallelism between the outer walls of the u-shape. Because rail 82 transfers bearing forces both in axial and radial directions, the present print head configuration need only use a single rail 82 throughout the length of travel of carriage assembly 60.

As shown in FIG. 14 by offset 200, upper tread surface 194 and lower tread surface 196 should be far enough apart to counteract any torsional forces about rail 82 (i.e., about an x-axis). Accordingly, tread surfaces 194, 196 interacting with treads 91 to prevent carriage assembly 60 from rotating or vibrating about an x-axis even though only one rail 82 is provided. The rail may be constructed to be wider than rail 82 shown. For instance, the rail may be about 4 inches wide. This additional width not only provides strength against bending in the y-direction, but also separates upper and lower rollers 90 to provide a greater moment arm against rotation or vibration about an x-axis.

It is important that carriage assembly 60 be maintained in a stable position as it is moved back and forth across the image. Any rotational vibration or variation about a z-axis would temporarily alter the placement of jets 98 and saber angle 132, causing poor printing results. This type of rotation is particularly likely to occur as the result of the quick directional changes which carriage assembly 60 undergoes as it is transported by drive belt 70. As shown in FIG. 3, rollers 90 have a significant lateral offset 202 between them. This lateral offset 202 allows rollers 90 to provide a significant moment about a z-axis and prevent any rotational movement or vibration of carriage assembly 60 about a z-axis.

It is similarly important that carriage assembly 60 be maintained a constant distance from printing media 28 and platen 42 as printing occurs. Jets 98 are designed to place uniformly sized ink dots on printing media 28 only from a particular distance. If jets 98 are too close, the ink will not be uniformly placed, or, worse yet, print face 96 may contact printing media 28 and smear ink. If jets 98 are too far, ink may similarly be non-uniform or splattered on the image. Additionally, because jets 98 are moving while ink is jetted, the distance between jets 98 and printing media 28 affects the location of ink dots. Any rotational vibration or variation about an x or a y-axis would temporarily alter the distance between jets 98 and printing media 28, causing poor printing results, as would any bending of rail 82 in the z-direction. Rollers 90 with treads 91, in combination with tread surfaces 194, 196, prevent movement of carriage assembly 60 in the z-direction. Similarly, lateral offset 202 allows treads 91 on rollers 90 to provide a significant moment about a y-axis to prevent any rotational movement or vibration of carriage assembly 60 about a y-axis.

While four rollers 90 are shown on carriage assembly 60, it will be noted that only three rollers are necessary to provide sufficient force to prevent rotation or vibration about a z-axis and/or about a y-axis. If three rollers are used, a single roller should be placed on one side of rail 82, in between two rollers placed on the other side of rail 82. Each of the rollers should be significantly offset from the other two. However, it is preferred that four rollers be used as shown in FIG. 3 to avoid the tendency for torsional bending of rail 82 and the possibility of vibrational movement about an x-axis.

Carriage assembly 60 must be constructed to be stiff enough to not allow any relative movement between rollers 90 and printer heads 84, 86. To increase stiffness between rollers 90 and carriage assembly 60, bearings for rollers 90 should be selected to allow little or no play between rollers 90 and bolts 92. Bearing free play in rollers 90 may be further reduced or eliminated by using a y-direction "preload". By having the distance between upper tread surface 194 and lower tread surface 196 slightly greater than the corresponding distance between treads 91 on rollers 90, rollers 90 place opposing forces on rail 82. These opposing forces, preferably from 3 to 5 lbs, help to take up bearing free play between opposing rollers 90. As with torsional force, pre-load force is better withstood by rail 82 if rollers 90 are provided in roller pairs.

The single rail 82 and attachment plate 184 system described avoids the problems of the prior art. Only one rail is used so there is no problem with parallelism between rails. The possibilities of bending of rail 82, any binding or looseness of rollers 90, and vibration or unwanted movement of carriage assembly 60 are prevented. Rail assembly 62 further provides better access to carriage assembly 60 and better removeability of carriage assembly 60.

BLOTTER ASSEMBLY

Figure 15:
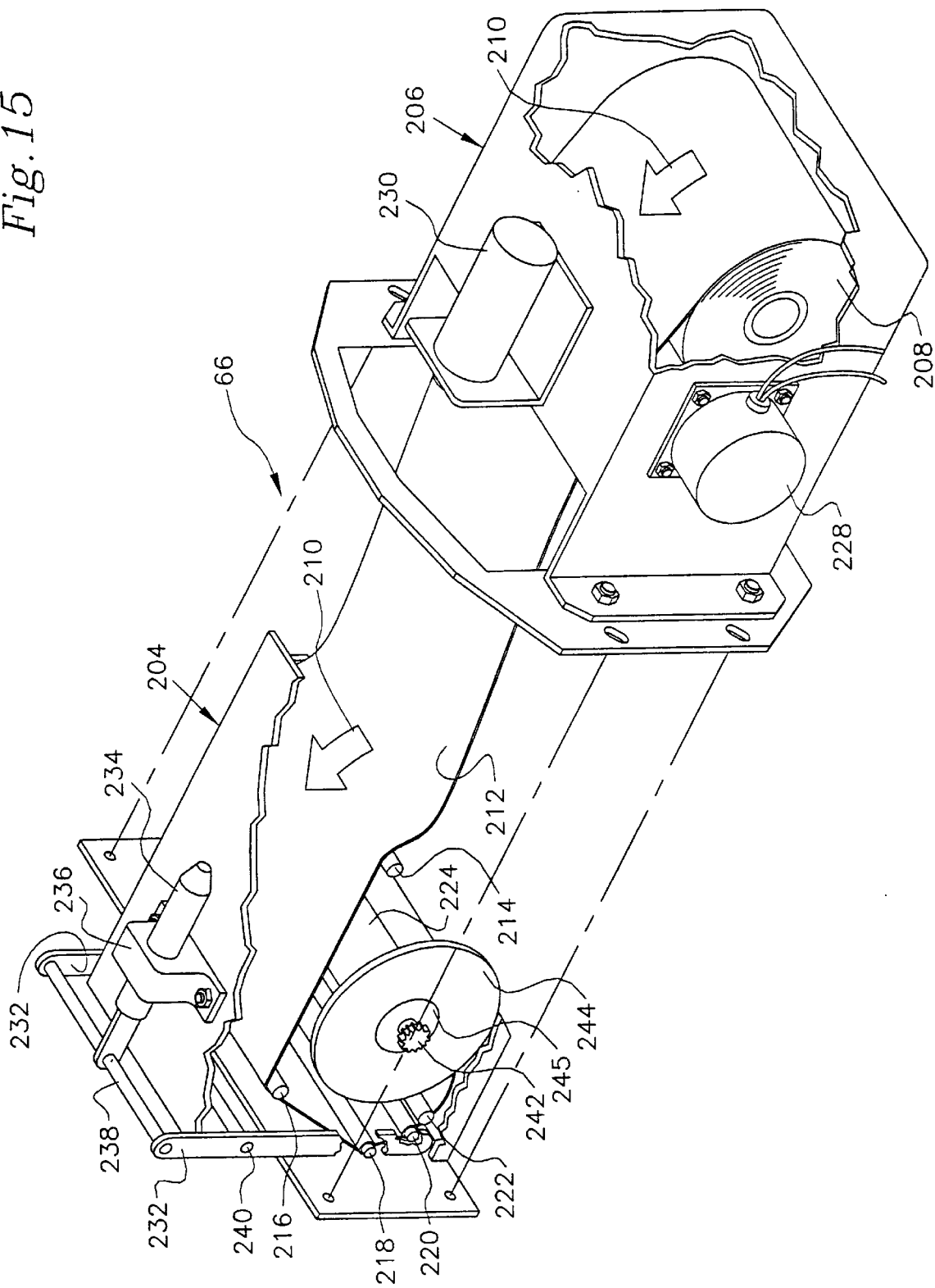
FIG. 15 is a perspective, exploded view of the blotter assembly of the present invention.
Figure 16:
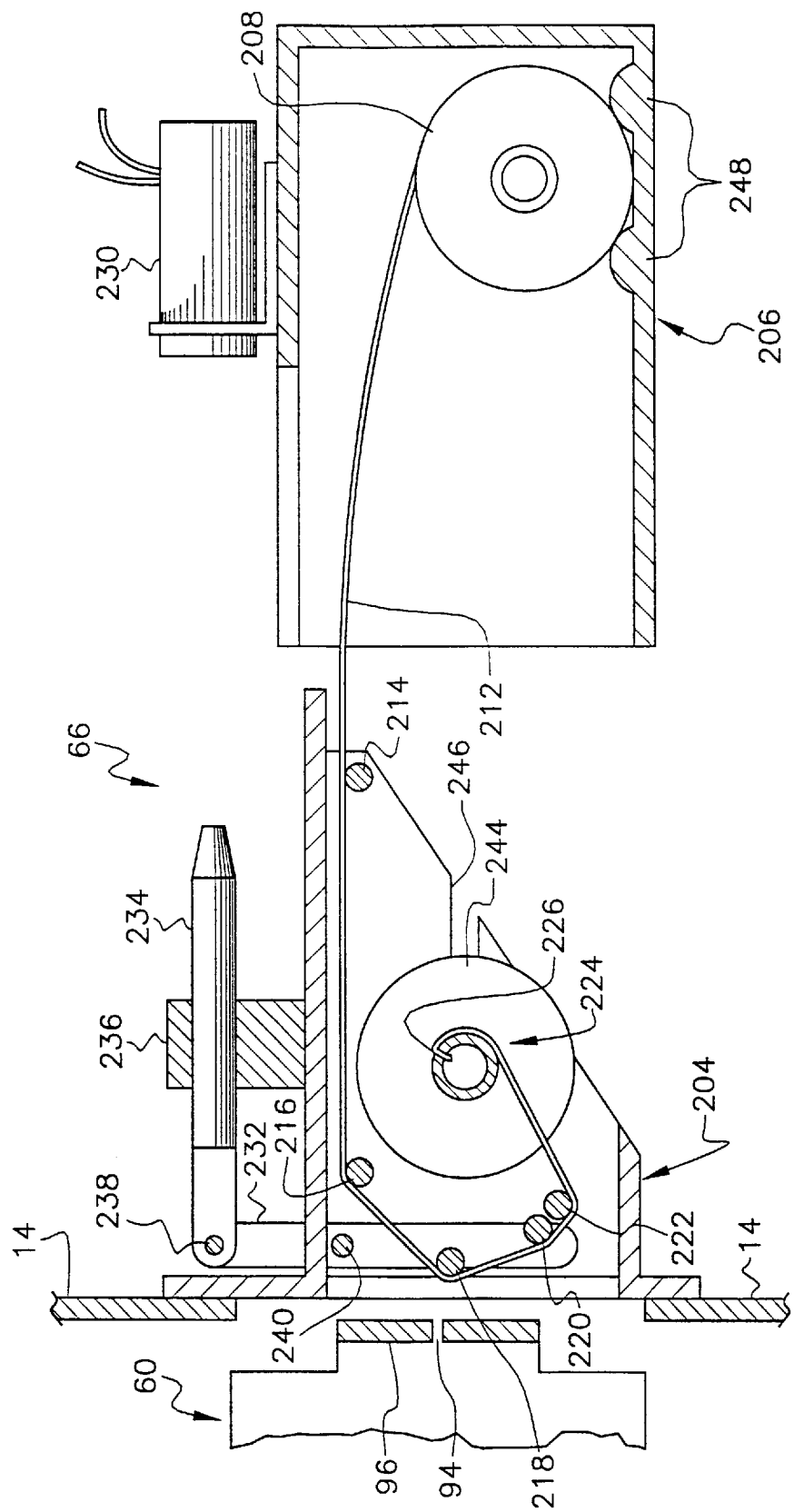
FIG. 16 is an exploded cross-sectional side view of the blotter assembly of the present invention.
Figure 17:
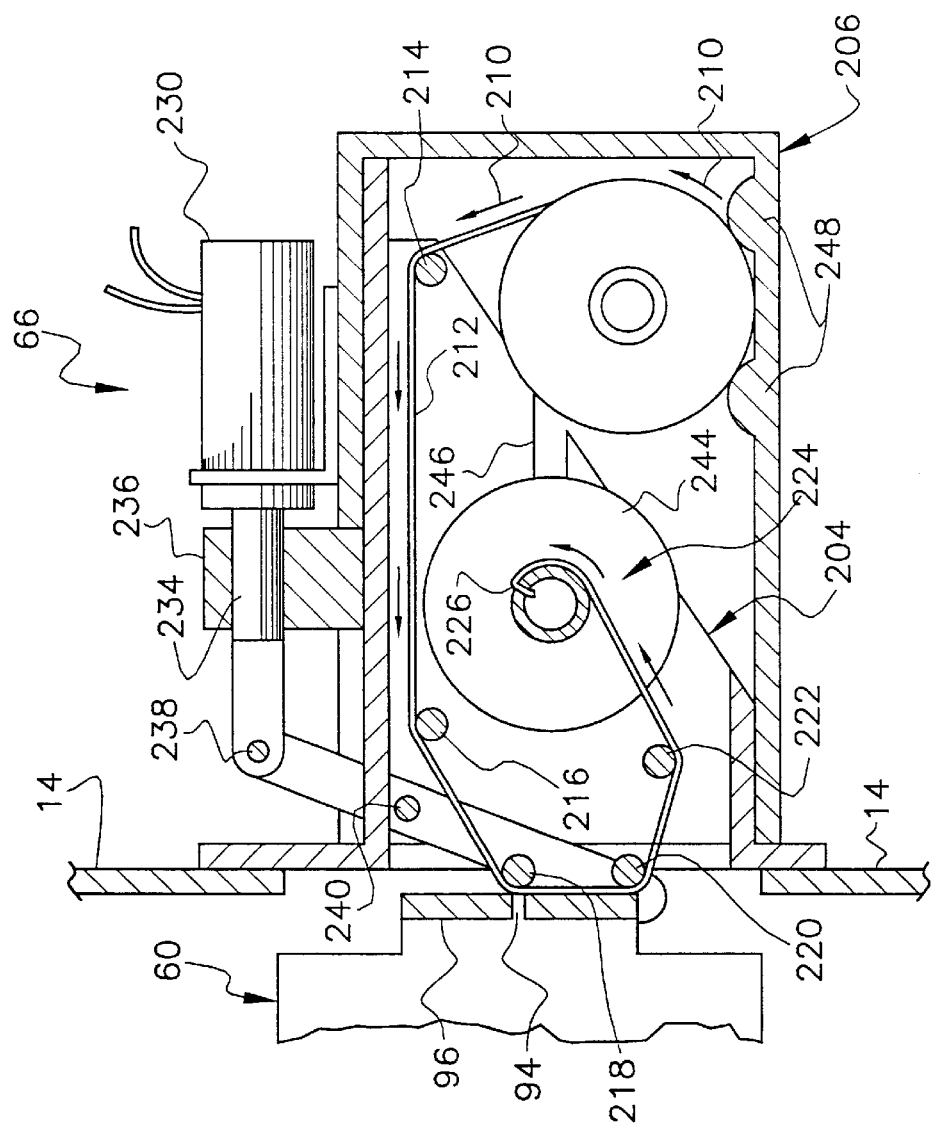
FIG. 17 depicts the blotter assembly of FIG. 17 in assembled, actuated (wiping) condition.

Blotter assembly 66 is shown in FIGS. 15–17. Blotter assembly 66 can be positioned at a peripheral location on printer housing 14, such that it is within the range of travel of carriage assembly 60 but off to the side of printing media 28. FIG. 16 shows print face 96 of carriage assembly 60 parked in front of blotter assembly 66, and FIG. 17 shows blotter assembly 66 wiping print face 96.

Blotter assembly 66 includes front housing 204 and removable rear housing 206. Rear housing 206 supports blotter paper supply roll 208. Blotter paper supply roll 208 is preferably a standard size of cash register tape which is widely available. While the blotting material is described as "paper" for ease of discussion, it will be recognized that blotter assembly 66 may use a material for blotting other than paper, and the type of blotting material is not significant to the invention. As indicated by arrows 210, blotter paper 212 is fed from supply roll 208, over guide bars 214, 216, and in front of wipers 218, 220. Blotter paper 212 then returns around guide bar 222 and onto take-up spool 224. Take-up spool 224 and guide bars 214, 216, 222 are supported by front housing 204.

As shown in FIGS. 16 and 17, take-up spool 224 has slot 226 for receiving blotter paper 212. Slot 226 allows blotter paper 212 to be readily attached to take-up spool 224, similar to threading of film into a camera. This attachment is further secured by rotation of take-up spool 224 placing multiple winds of blotter paper 212 over take-up spool 224 and slot 226. Take-up spool 224 is rotated by motor 228 when desired to pull paper 212 from supply roll 208 and onto take-up spool 224.

The mechanism to press blotter paper 212 against print face 96 includes solenoid 230 and actuator arms 232. Solenoid plunger 234 is slideably received in plunger guide 236 on front housing 204. When rear housing 206 is positioned against front housing 204, solenoid plunger 234 is received within solenoid 230. Solenoid plunger 234 is pivotally attached to actuator arms 232 by attachment bar 238. Actuator arms 232 are pivotally attached to front housing 204 at pivot points 240. Wipers 218, 220 are supported between actuator arms 232. Wipers 218, 220 are preferably rotationally mounted on actuator arms 232, permitting rotational movement with blotter paper 212. Wipers 218, 220 can press blotter paper 212 against print face 96 without damaging print face 96 or jets 98.

As shown in FIG. 16, actuator arm 232 has a resting position wherein wipers 218, 220 are positioned off print face 96 and blotter paper 212 does not extend beyond front housing 204. Paper tension provided on take-up spool 224 normally holds actuator arm 232 in this resting position. Alternatively, actuator arm 232 may include a spring, be biased by solenoid 230, or otherwise be normally biased into this resting position. Blotter assembly 66 normally takes on this resting orientation throughout printing of printer 10, until wiping of print face 96 is desired. Wiping may be done initially at start up of printer 10, again after a specified number of copies or amount of ink usage, and/or at any intervals as determined by user or software control.

When wiping of print face 96 by blotter assembly 66 is desired, carriage assembly 60 is positioned adjacent blotter assembly 66. Blotter assembly 66 then wipes print face 96 as shown in FIG. 17. Solenoid 230 is activated to pull solenoid plunger 234 rearward. This in turn pivots actuator arms 232 about pivot point 240, pressing wipers 218, 220 against print face 96. Wiper 218 is pressed against line of jets 94 to clean any ink gathered about line of jets 94. Wiper 218 is pressed against the lower edge of print face 96, where ink may gather due to gravity. With blotter paper 212 held in this position, motor 228 rotates take-up spool 224 to wipe blotter paper 212 across print face 96.

As shown in FIG. 15, take-up spool 224 includes spur gear 242. Front housing 204 and take-up spool 224 position spur gear 242 for connection to motor 228. This connection allows rotational force to be transmitted from motor 228 to take-up spool 224 even though take-up spool 224 is supported on front housing 204. As shown in FIGS. 16 and 17, front housing includes openings 246 for receiving take-up spool 224. Although only one opening 246 is shown, the other side of front housing (broken away in FIG. 15) may include a similar opening, to receive take-up spool 224 between spur gear 242 and side guide 244. Openings 246 allow take-up spool 224 to be rotationally carried by front housing 204 and further be readily removed from front housing 204. When paper supply roll 208 is fully used by blotter assembly 66, all of the paper from supply roll 208 will have been transferred to take-up spool 224. When paper supply roll 208 is replaced, take-up spool 224 is removed from front housing 204 and used paper 212 is removed from take-up spool 224. The separability between motor 228 and spur gear 242 allows take-up spool 224 to be removed without interference from motor 228.

Take-up spool 224 also includes side guides 244. Side guides 244 accurately position the paper across spool 224. As shown in FIG. 15, side guide 244 includes an opening 245 for placement onto take-up spool 224. Opening 245 in side guide 244 is slightly larger than spur gear 242, and thus side guide 244 can be removed from take-up spool 224 over spur gear 242. This allows used paper 212 to be removed off the side of take-up spool 224. Workers skilled in the art will appreciate that a removable side guide 242 could be used on either side or both sides of take-up spool 224. Removable side guide 242 allows used blotter paper 212 to be easily removed off the side of take-up spool 224 during replacement of blotter paper 212.

Blotter paper supply roll 208 is gravitationally retained in trough 248. Trough 248 allows paper supply roll 208 to be positioned and retained in rear housing 206 without a paper supply spool. Paper supply roll 208 is freely rotated when paper 212 is pulled off, subject only to friction associated with trough 248. Alternatively, tangs (not shown) may be provided on the sides of rear housing 206 to help in holding paper supply roll 208 in place and provide friction against rotation of supply roll 208. Because no paper supply spool is needed, insertion of paper supply roll 208 into rear housing 206 requires no steps other than setting paper supply roll 208 into trough 248.

Separability between front housing 204 and rear housing 206 allows ready access to paper supply roll 208 and/or paper take-up spool 226. This ready access is beneficial both for changing paper rolls and for maintenance of the blotter assembly 66. This separability benefit can be obtained by attaching either front housing 204 or rear housing 206 to printer housing 14, with the other housing portion removable therefrom. Separability between front housing 204 and rear housing 206 further allows ready removeability of take-up spool 226 during separation, but secures take-up spool 226 in opening 246 when front housing 204 and rear housing 206 are placed together.

FIRE PULSE ADJUSTMENT

FIG. 18 depicts a greatly enlarged view of a portion of an encoder strip 106. FIGS. 19 and 20 graphically represent a set of pulses produced by carriage 88 moving across encoder strip 106 from left to right. FIGS. 21–23 similarly show an encoder strip 106 and set of pulses produced, but in FIGS. 21–23 carriage 88 is moving from right to left.

Encoder strip 106 has a number of markings 250 which are relatively evenly spaced across the length of encoder strip 106. Markings 250 on encoder strip 106 may be shaded lines, holes or other markings which can be read and translated into a signal. Markings 250 may be photographically etched onto encoder strip 106, may be printed or etched by a laser, or may be placed onto encoder strip 106 by other means. With reference to print head 84 and carriage 88 shown in FIG. 3, markings 250 can be optically read by encoder strip reader 104 on carriage 88. While only a small portion of encoder strip 106 bearing markings 250$f$–$n$ is shown in FIGS. 18–23, encoder strip 106 and markings 250 continue across the entire length of travel of carriage 88.

Each of markings 250 has a left edge 252, a right edge 254, and a width 256 therebetween. Each pair of adjacent markings 250 define a spacing 258 between markings 250. Adjacent left edges 252 have a distance 260 between them, and adjacent right edges 254 have a distance 262 between them. In a preferred embodiment for desired print resolution of 300 dots per inch, width 256 and spacing 258 are approximately $\frac{1}{300}$th of an inch, and distances 260, 262 are approximately $\frac{1}{150}$th of an inch. In this way, each marking 250 and each spacing 258 corresponds to a potential ink dot location or pixel.

Ideally, each width 256 and each spacing 258 would be uniformly equal. However, encoder strip 106 and markings 250 thereon may have a number of inaccuracies. Width 256 may not be uniform among all the markings 250 on encoder strip 106. This inaccuracy may occur particularly in a photographically etched encoder strip, as the photographic lens used in producing the encoder strip creates imaging errors which affect width 256. Photographically etched imaging errors tend to be greater toward the ends of an encoder strip 106 than they are in the middle of an encoder strip 106. Accordingly, markings 250 in the center of an encoder strip 106 may have a different width 256 than markings near an end of an encoder strip 106. Errors in width 256 may further occur due to inaccurate or non-uniform tensioning, due to thermal shrinkage or expansion of the encoder strip, due to other aberrations in production, etc.

In addition to various uniformity errors in width 256, width 256 may not be equal to spacing 258 between markings 250. As shown in FIGS. 18 and 21, each marking 250 may have a width 256 which is slightly smaller than spacing 258. With a photographically etched encoder strip 106, distances 260 and distances 262 are generally more uniform across the length of encoder strip 106 than either widths 256 or spacings 258. There may be further errors in encoder strip 106 such that distances 260 or distances 262 are not uniform along encoder strip 106. All of these encoder strip errors can lead to inaccuracies in dot placement on a printed image.

Encoder strip reader 104 has two optical sensors, the location of which is represented by arrows 264 and 266. Optical sensors 264, 266 have a distance 268 between them. As will be explain below, distance 268 preferably positions optical sensors 264, 266 such that optical sensor 264 is in the center of a marking 250 when optical sensor 266 is at an edge 252, 254, and vice versa. When carriage 88 is traveling left to right as represented by the set of pulses in FIGS. 19 and 20, left edges 252 are leading edges and right edges 254 are trailing edges. When carriage 88 is traveling right to left as represented by the set of pulses in FIGS. 22 and 23, right edges 254 are leading edges and left edges 152 are trailing edges.

Optical sensor 264 produces a pulse A, and optical sensor 266 produces pulse B. Both pulse A and pulse B are binary signals, with changes between high and low values corresponding with edges 252 and 254 as each optical sensor 266 passes over markings 250. Each marking 250 produces high value 270 when read by optical sensors 264, 266, and spacing 258 between markings 250 produces low value 272 when optical sensors 264, 266 pass over it.

FIG. 19 shows the Pulse A and Pulse B signals read from the encoder strip 106, as a function of x-location on encoder strip 106. High values 270 are designated $f$–$n$ corresponding to the encoder strip marking 250$f$–$n$ which produced the high value 270. As shown in FIG. 18–20, sensor 264 is presently located over marking 250$n$ as carriage 88 moves from left to right across encoder strip 106. Sensor 266 is presently located between markings 250$j$ and 250$k$.

FIG. 20 shows the pulses A and B as a function of time rather than a function of x-location. Each of high values 270 is again labeled according to the encoder strip marking 250 which created the high value 270. Because both encoder strip sensors 264, 266 are travelling at the same velocity at any given time, the durations of each high value 270 are similar at any point in time. However, the durations of high values 270 may change as carriage 88 accelerates and decelerates during a print scan. FIG. 20 illustrates carriage acceleration across markings 250$f$–$i$, prior to reaching relatively constant velocity across markings 250$j$–$n$.

Each high value 270 has a rising edge 274 and a falling edge 276. Distance 268 is not equal to a whole number of encoder strip markings 250, and thus high values 270 between pulse A and pulse B occur at different points in time. Accordingly, the timing of rising and falling edges 274, 276 from pulse B is different than the timing of rising and falling edges 274, 276 from pulse A.

The direction of carriage 88 can be determined from a comparison of the "leading falling edges" of pulse A and pulse B. When carriage 88 is traveling from left to right as represented in FIG. 20, each falling edge 276 of pulse A occurs when pulse B is at a high value 270. In contrast, each falling edge 276 of pulse B occurs when pulse A is at a low value 272. Pulse A therefore has a "leading falling edge" when carriage 88 is traveling from left to right.

FIGS. 22 and 23 represent pulses A and B when carriage 88 is travelling from right to left, or in the negative x-direction. The distance 268 between optical sensor 264 and optical sensor 266 remains constant regardless of direction of travel, but now optical sensor 266 is in front. As can be seen in FIG. 23 when pulses A and B are mapped as a function of time, each falling edge 276 of pulse A occurs when pulse B is at a low value 272, and each falling edge 276 of pulse B occurs when pulse A is at a high value 270. Pulse B therefore has a "leading falling edge" when carriage 88 is traveling from right to left.

It should be understood that FIGS. 19, 20, 22 and 23 are simplified for description purposes, and may not accurately reflect signals actually received in a particular configuration. For instance, pulses A and B are shown as square signals with little or no noise. The actual signal may include significant noise and require filtering to arrive at a square signal. Resolution of pulse A can be increased by interpolating the timing of pulse A against a timer. Pulse A might thus be generated such that it changes from high to low or vice versa at two, three or four times the rate of leading edges on encoder strip 106. In any event, workers skilled in the art will recognize that various methods of creating pulses A and B from the encoder strip reader 104 may be employed. Workers skilled in the art will recognize that methods other than encoder strip 106 and reader 104 exist by which to produce a signal indicative of carriage location. The present invention is applicable to adjust any such signal indicative of carriage location with respect to a parameter of the printer.

To aid in simplicity of calculation, it is preferred that carriage 88 be driven such that print head 84 has a uniform velocity across the entire image. With a multiple print head system, it is preferred that the uniform velocity be maintained at all times that any print head 84, 86 is over the image. In the preferred embodiment printer 10 with image sizes up to 54 inches with two print heads 84, 86 and an offset of approximately six inches between the first and last jets 98 of the two print heads 84, 86, the desired velocity profile has 66 inch-wide section of constant velocity when either print head 84, 86 is above the image. The total travel of carriage 88 during printing includes approximately another six inches beyond each side of the image for carriage 88 to decelerate, reverse direction, and accelerate again to the desired constant velocity. The portion of the encoder strip 106 shown in FIG. 18 is the location where carriage 88 reaches uniform velocity when travelling from left to right. Accordingly, the duration of pulses A and B gradually decreases during carriage acceleration until sensor 264 reaches marking 250k, at which point carriage 88 has reached uniform velocity. Because each sensor 264, 266 travels at the velocity of carriage 88, pulse A has the leading falling edge for left to right travel regardless of the increasing velocity of carriage 88.

Figure 24A:
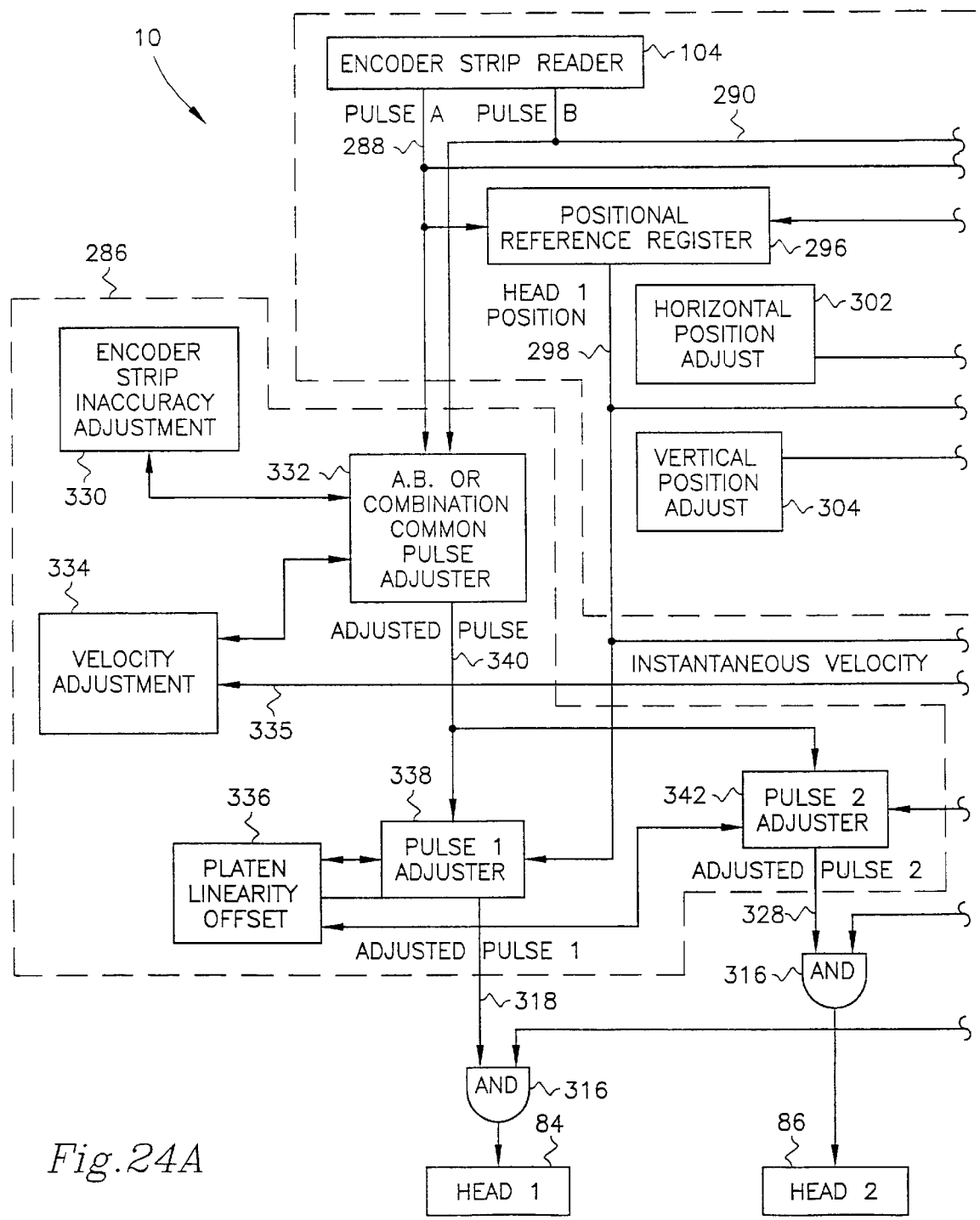
FIG. 24 is a flow chart indicative of how a locational signal such as from an encoder strip reader is manipulated into an adjusted fire pulse in accordance with the present invention.
Figure 24B:
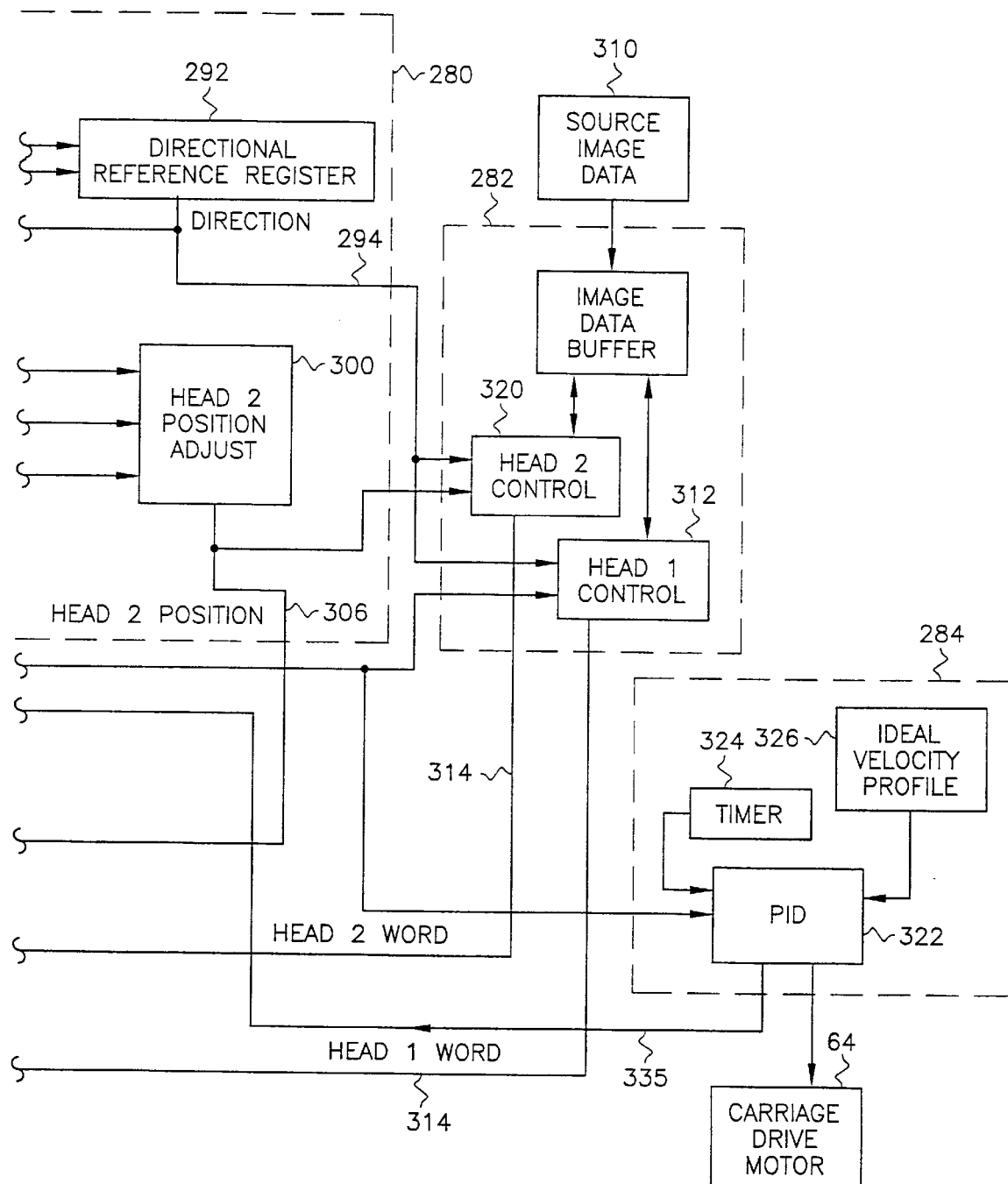

FIG. 24 is a flow chart indicating the mechanism for print head firing in accordance with the present invention. Printer 10 conceptually includes a positional calculation circuit 280, a head control circuit 282, a drive motor control circuit 284, and a fire pulse adjuster circuit 286, all of which are interrelated. Each of these circuits 280, 282, 284, 286 may occur in a microprocessor, may occur in hardware, or may be otherwise implemented into the circuitry for printer 10 as desired.

Positional calculation circuit 280 includes encoder strip reader 104 which generates pulse A 288 and pulse B 290 as described above. Pulse A 288 and pulse B 290 are fed to a directional reference register 292. Directional reference register 292 compares leading falling edges of pulse A 288 and pulse B 290 to maintain a register signal 294 indicative of carriage 88 direction.

Positional reference register 296 is a counter indicative of the x-location of carriage 88. Positional reference register 296 counts up with each high value 270 received in pulse A when directional reference register 292 indicates travel in the positive x-direction, and counts down with each high value 270 received in pulse A when directional reference register 292 indicates travel in the negative x-direction. Positional reference register 296 produces a signal 298 which indicates the position of the carriage 88 on the printer 10. In a single print head system, this position 298 of the carriage 88 may be taken as corresponding directly to the position of the print head1 84. In a multiple print head system, the position of the carriage 88 may be taken as corresponding directly to the position of print head1 84, with remaining print head positions calculated therefrom.

Head2 position adjuster 300 calculates the position of the second print head 86. Horizontal position adjust 302 and vertical position adjust 304 are added to the head1 position 298 to determine a head2 position 306. Horizontal position adjust 302 and vertical position adjust 304 may be determined based on nominal offsets between print head1 84 and print head2 86. Head2 86 may have a horizontal and vertical offset from head1 84 which differs from printer to printer based on manufacturing errors, and horizontal position adjust 302 and vertical position adjust 304 may alternatively be based on offsets between print head1 84 and print head2 86 which are measured during manufacture of printer 10. Horizontal position adjust 302 and vertical position adjust 304 may be further based on calibration results discussed earlier. Preferably all three sources of information are used to determine the adjustment to head1 position 298 to arrive at the correct head2 position 306.

The determination of which ink jets 98 on the print heads 84, 86 are to be fired for each fire pulse is performed by head control circuit 282. Source image data 310 is placed into an image data buffer 312, which may be a two-dimensional look-up table. Based on head1 position 298, head1 control 312 computes the x- and y-address of each ink jet 98 on head1 84. Head1 control 312 then references image data buffer 312 and determines a printing word 314 to be subsequently printed by the head1 84. Printing word 314 is a binary command with one bit for each ink jet 98, instructing each ink jet 98 to fire or not to fire on a given fire pulse. This printing word 314 is used with and-gate 316, such that the desired jets 98 of head1 84 print based on timing of adjusted pulse1 318. For a printer 10 with two print heads 84, 86, head2 control 320 operates similarly to head1 control 312, but using head2 position 306.

The overall velocity of an ink dot is a function of the firing velocity from the ink jet 98 and also the velocity of carriage 88. Ink dots have a z-direction velocity imparted by ink jet 98, and also have an x-direction velocity equal to the x-direction velocity of carriage 88. This x-direction velocity causes an ink dot to contact the media 28 at a significantly different x-location than the x-location of the ink jet 98 at firing. Particularly as the velocity of carriage 88 increases to achieve faster print rates, this x-direction velocity cannot be ignored in accurate positioning of ink dots on the media 28. Accordingly, head1 control 312 and head2 control 312 also reference carriage direction 294 in retrieving the desired printing word 314.

The drive motor control circuit 284 preferably uses a proportional-integral-derivative loop ("PID loop") 322 to control the position and velocity of carriage 88. PID loops 322 are known to workers skilled in the art to control carriage drive motors 64, and generally work as follows. PID loop 322 times changes in the head1 positional signal 298 with timer 324, and compares these changes against a desired velocity profile 326. In this comparison, PID loop 322 looks at a proportional difference (i.e., the amount that carriage position differs from desired position), an integrated term (i.e., the sum of all the past errors in position), and a derivative term (i.e., the rate at which the proportional difference is changing). PID loop 322 controls the voltage applied to carriage drive motor 64 to see that position, velocity and acceleration of carriage 88 are all maintained as closely as possible to the desired velocity profile 326.

In contrast to prior art devices, neither pulse A 288 nor pulse B 290 is used to directly signal the timing of the firing of print heads 84, 86. Rather, pulse A is manipulated in fire pulse adjuster circuit 286 to provide adjusted fire pulses 318, 328 to both print head1 84 and print head2 86. Fire pulse adjuster circuit 286 adjusts pulse A 288 based on a parameter of the printer 10. Several different parameters may be used to adjust pulse A 288 to a desired signal for firing print head1 and head2 84, 86. In the preferred embodiment, a number of separate adjustments are made to pulse A 288 when used in firing.

A first adjustment to pulse A 288 is due to encoder strip inaccuracy discussed previously. Each marking 250 on encoder strip 106 is closely measured during manufacture of the printer 10 to determine any positional error associated with the marking 250. These positional errors are recorded as an encoder strip inaccuracy adjustment 330. Encoder strip inaccuracy adjustment 330 may be stored in a one-dimensional look-up table for look-up based on the x-position of carriage 88.

Common pulse adjuster 332 references the encoder strip inaccuracy adjustment 330 based on the particular position of head 1, and adjusts the timing of pulse A 288 to account for any inaccuracy of encoder strip 106. In printers 10 with multiple print heads 84, 86, pulse A 288 is indicative of the overall x-position of carriage 88. If all print heads 84, 86 are carried on a single carriage 88, a single adjustment may be made to the timing of pulse A 288 based on the encoder strip inaccuracy 330, and the single adjustment applies equally to all print heads 84, 86.

The x-direction velocity of carriage 88 introduces a second error which is addressed by velocity adjustment 334 of fire pulse adjuster circuit 286. Due to various errors, carriage 88 does not exactly follow desired velocity profile 326, but rather is subject to small, instantaneous accelerations and decelerations. Sticking points or tight spots on rail 32, imperfect bearings for rollers 90, errors in the belt drive system of carriage drive motor 64 and other similar causes contribute to an instantaneous small velocity error. Accordingly, it is preferred that the actual instantaneous velocity of carriage 88 be used in making the velocity adjustment 334. Because PID loop 322 already calculates velocity of carriage 88, PID loop 322 can also supply instantaneous velocity data 335 to velocity adjustment 334.

Additionally, the velocity adjustment circuit 334 may store data from velocity calculations of previous runs across the image. Any sticking points or tight spots on the rail assembly 62 may cause recurring small velocity errors in carriage 88 travel. These recurring velocity errors can be predicted and accounted for in velocity adjustment 334. Ideally, velocity adjustment 334 will alter the timing of pulse A 288 taking into account both the instantaneous velocity 335 of the carriage 88 and historical data from previous velocity profiles of the carriage 88.

A third error occurs with regard to bi-directional printing. As discussed above, a delay time which occurs between sensing an encoder strip marking and placing an ink dot on the media. This delay time is largely due to the flight time of the ink dot, but may further be due to electromechanical firing delay of the ink jet. In bi-directional printing, the delay time affects placement of the ink dot in different directions based on the direction of print head travel. Accordingly, common pulse adjuster 332 and velocity adjustment 334 take into account the direction of carriage travel 294.

A fourth error that can be addressed in a pulse adjustment circuit is "platen non-linearity offset" 336. Platen non-linearity offset 336 can be defined as any variation in the distance between ink jets 98 and the surface of platen 42. In a perfect mechanical system, the distance from heads 84, 86 to platen 42 would be maintained at a constant value, and the position of printed ink dots on the media 28 would be highly predictable. However, printers are not mechanically perfect. Platen 42 may have warpage, curvature, improper alignment or other manufacturing and assembly tolerance errors. The carriage assembly 60 and the rail assembly 62 could also have such alignment problems. These problems affect printing quality as follows. As explained above, ink droplets fired from moving print heads 84, 86 have an x-direction velocity which cannot be ignored. The location that an ink droplet contacts the media 28 (x) is dependant upon the firing location ($x_{firing}$), upon the x-direction velocity of the ink droplet ($v_x$), and upon the travel time of the ink droplet (t): $x=x_{firing}+(v_x \times t)$. The travel time of the ink droplet is dependant upon the y-direction firing velocity of the ink droplet ($v_y$), upon the distance between the ink jet 98 and platen 42 ($d_{platen}$), and upon the media thickness ($t_{media}$): $t=v_y(d_{platen}-t_{media})$. Accordingly, if the distance between the inkjet 98 and the platen 42 varies from location to location, this difference can cause positioning errors in the placement of ink droplets.

In the preferred embodiment, platen non-linearity offset 336 is addressed in fire pulse adjuster circuit 286. The amount of any variation in distance between platen 42 and carriage 88 is measured during manufacturing of printer 10 and recorded as platen non-linearity offset 336. Platen non-linearity offset 336 may be stored in one-dimensional look-up table for look-up based on the x-position of carriage 88. Based on the head1 position signal 298, pulse1 adjuster 338 references platen non-linearity offset 336 and adjusts adjusted pulse 340 for any error, thereby forming adjusted pulse1 318. Adjusted pulse1 318 is used to time the firing of head1 84.

On a multi-head printer, the error from platen non-linearity offset 336 may be separately handled for each print head 84, 86. Pulse2 adjuster 342 references platen non-linearity offset 336 similar to pulse1 adjuster 338, but using the head2 position signal 306. Pulse2 adjuster 342 adjusts adjusted pulse 340 to get adjusted pulse2 328. Adjusted pulse2 328 is used to time the firing of head2 86. The pulse2 adjuster 342 may further account for the horizontal position adjustment 302 to time the firing of head2 86 to an accuracy greater than the nearest horizontal pixel.

Workers skilled in the art will appreciate that these various techniques can be modified or improved based upon the particular situation. For instance, fire pulse adjuster circuit 286 may take the thickness of media 28 into account in adjusting the timing of pulse A 288, particularly for bi-directional printing.

For print heads wherein printing occurs at multiple y-locations as well as multiple x-locations, the platen 88 may have warpage or misalignment in the y-direction as warpage in the x-direction. "Platen planarity offset", i.e., the amount the each x-y location on platen differs from a planar surface defined by print head 84, could be measured and recorded. The pulse adjuster circuit could then adjust the firing pulse such that each ink jet is fired independently based on its particular distance between the jet and the media. Similar adjustments could be made for multiple print heads offset in the y-direction.

In the preferred embodiment, both encoder strip inaccuracy 330 and platen non-linearity offset 336 are measured during manufacture of printer 10. While measure during manufacture will largely correct these errors, part of the errors may be due to environmental parameters such as printer temperature, humidity, etc. These or other errors of printer 10 may be more accurately corrected by installing a sensor to calculate the parameter during printing.

The present invention contemplates adjusting pulse A 288 by other parameters of printer 10. For instance, parameters such as ambient temperature, printer temperature, humidity, ink viscosity (which may differ based not only on different or non-homogenous types of ink but also based on differing ink temperature at various x-locations or y-locations on the image), or any other parameter that may affect the final output can further be accounted for in the fire pulse adjuster circuit 286 to appropriately determine the timing used for firing of the print heads 84, 86.

By adjusting pulse A 288 based on these parameters of the printer 10, ink dots may be printed in precise controlled locations on the image. This precise locational control helps to avoid problems such as banding, stitching, and granularity.

Although the present invention has been described with reference to preferred embodiments, workers skilled in the art will recognize that numerous changes may be made in form and detail not mentioned herein without departing from the spirit and scope of the invention. For instance, workers skilled in the art will appreciate that this structure can be manipulated to handle as many print heads as desired.

What is claimed is:

1. An ink jet printer for printing pixels on a printing medium, the ink jet printer comprising:
    a print head having a plurality of ink jets;
    a first transport system moving the print head with an x-direction of travel relative to the printing medium;
    a second transport system for advancing the printing medium with respect to the print head in a y-direction of travel;
    wherein the plurality of ink jets have a uniform y-component spacing in the y-direction of travel, each of said ink jets being spaced from an adjacent ink jet at a y-component in the y-direction of more than 2 pixels;
    wherein the printing medium is advanced by said second transport system in a series of non-uniform distances, the plurality of ink jets further comprise a number of linearly arranged ink jets in each of a plurality of ink colors and each said series of non-uniform distances is made up of four advances of the printing medium and a total distance of advance from said series of non-uniform distances is equal to the number of linearly arranged ink jets in a one of said plurality of ink colors times four pixels; and wherein the number of linearly arranged ink jets in each color is 48, and each said series of non-uniform distances is made up of a number of consecutive advances of the printing medium of 49, 49, 45, and 49 pixels, respectively.

2. A method of printing pixels on a printing medium with a reciprocating non-impact print head, the method comprising the steps of:
    printing the first pixel row on a printing medium with each of a plurality of uniformly-spaced ink jets of a common color such that each said first pixel row is printed with a uniform spacing from an adjacent, other first pixel row;
    advancing the printing medium a first distance ($d_1$) relative to the print head;
    printing a second pixel row with each of the plurality of uniformly-spaced ink jets, each said second pixel row being parallel to and offset from each said first pixel row;
    advancing the printing medium a second distance ($d_2$) relative to the print head;
    printing a third pixel row with each of the plurality of ink jets, each said third pixel row being parallel to and offset from each said first pixel row and each said second pixel row;
    advancing the printing medium a third distance ($d_3$) relative to the print head;
    printing a second pixel row with each of the plurality of ink jets, each said fourth pixel row being parallel to and offset from each said first pixel row and each said second pixel row and each said third pixel row; and
    advancing the printing medium a fourth distance ($d_4$) relative to the print head;
    wherein the first distance is greater than one pixel ($d_1>1$), the second distance is greater than one pixel ($d_1>1$), the first distance is not equal to the second distance ($d_1 \neq d_2$), and wherein the printing medium advances are in a direction perpendicular to each said first pixel row, second pixel row, third pixel row, and fourth pixel row; and wherein the sum of the first distance, the second distance, the third distance, and the fourth distance is equal to the total number of said plurality of uniformly-spaced ink jets of a color times the uniform spacing of the first pixel row from said adjacent other first pixel row ($d_1+d_2+d_3+d_4=n \times s$).

3. The method of claim 2, wherein the first distance is ($d_1$) 49 pixels; the second distance is ($d_2$) 45, pixels; the third distance is ($d_3$) 49 pixels; the fourth distance is (($d_4$) 49 pixels; the number of the plurality of uniformly-spaced ink jets of a color is 48; and the uniform spacing between the first pixel row and said adjacent, other first pixel row is 4 pixels.

* * * * *